US 007946487B2

(12) United States Patent
Silverbrook et al.

(10) Patent No.: US 7,946,487 B2
(45) Date of Patent: *May 24, 2011

(54) AUTHENTICATION OF PHARMACEUTICAL PRODUCTS

(75) Inventors: Kia Silverbrook, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 23 days.

This patent is subject to a terminal disclaimer.

(21) Appl. No.: 12/433,847

(22) Filed: Apr. 30, 2009

(65) Prior Publication Data
US 2009/0222285 A1 Sep. 3, 2009

Related U.S. Application Data

(63) Continuation of application No. 11/041,627, filed on Jan. 25, 2005, now Pat. No. 7,537,157.

(30) Foreign Application Priority Data

May 18, 2004 (AU) ................................ 2004902623

(51) Int. Cl.
G06K 19/00 (2006.01)
G06Q 30/00 (2006.01)
G06Q 90/00 (2006.01)

(52) U.S. Cl. ........ 235/385; 235/375; 235/383; 235/487; 705/2; 705/3

(58) Field of Classification Search .................. 235/375, 235/383, 385, 487; 705/2, 3
See application file for complete search history.

(56) References Cited

U.S. PATENT DOCUMENTS

| 4,359,633 | A | 11/1982 | Bianco |
| 4,745,269 | A * | 5/1988 | Van Gils ........................ 235/487 |
| 5,992,742 | A | 11/1999 | Sullivan et al. |
| 6,021,392 | A | 2/2000 | Lester et al. |
| 6,069,955 | A | 5/2000 | Coppersmith et al. |
| 6,587,945 | B1 | 7/2003 | Pasieka |
| 6,903,726 | B1 * | 6/2005 | Bock ............................. 345/166 |
| 6,976,628 | B2 * | 12/2005 | Krupa ....................... 235/462.08 |

(Continued)

FOREIGN PATENT DOCUMENTS

| CA | 2339894 A1 | 10/2001 |
| CN | 1344462 A | 4/2002 |
| CN | 1351724 A | 5/2002 |
| CN | 1352706 A | 6/2002 |

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

Primary Examiner — Daniel A Hess
Assistant Examiner — Ali Sharifzada

(57) ABSTRACT

A method for authenticating a pharmaceutical product, the pharmaceutical product being associated with packaging having disposed thereon or therein coded data including a number of coded data portions, each coded data portion being indicative of an identity of the pharmaceutical product and at least part of a digital signature of at least part of the identity. The method includes having a computer system receive indicating data from a sensing device, the sensing device being responsive to sensing of the coded data to generate indicating data at least partially indicative of the identity of the pharmaceutical product and the signature part. The computer system determines the identity at least one determined signature part and uses these to authenticate the pharmaceutical product.

10 Claims, 27 Drawing Sheets

| U.S. PATENT DOCUMENTS | | | | FOREIGN PATENT DOCUMENTS | | |
|---|---|---|---|---|---|---|
| 7,111,780 B2 | 9/2006 | Broussard et al. | | CN | 1377490 A | 10/2002 |
| 7,537,157 B2 | 5/2009 | Silverbrook | | GB | 2306669 A | 5/1997 |
| 7,637,419 B2 | 12/2009 | Silverbrook | | WO | WO 97/17671 A1 | 5/1997 |
| 7,676,382 B2 | 3/2010 | Silverbrook et al. | | WO | WO 99/18487 A2 | 4/1999 |
| 2003/0070394 A1 | 4/2003 | Rosenbaum | | WO | WO 99/50787 A1 | 10/1999 |
| 2004/0205343 A1* | 10/2004 | Forth et al. | 713/168 | WO | WO 02/095675 A1 | 11/2002 |
| 2005/0261936 A1 | 11/2005 | Silverbrook et al. | | WO | WO 03/026558 A2 | 4/2003 |
| 2006/0091208 A1* | 5/2006 | He et al. | 235/385 | | | |

* cited by examiner

| 00 | 10 | 00 | 10 | 00 | 10 |
|----|----|----|----|----|----|
| 01 | 11 | 01 | 11 | 01 | 11 |
| 00 | 10 | 00 | 10 | 00 | 10 |
| 01 | 11 | 01 | 11 | 01 | 11 |

| 00 | 10 |
|----|----|
| 01 | 11 |

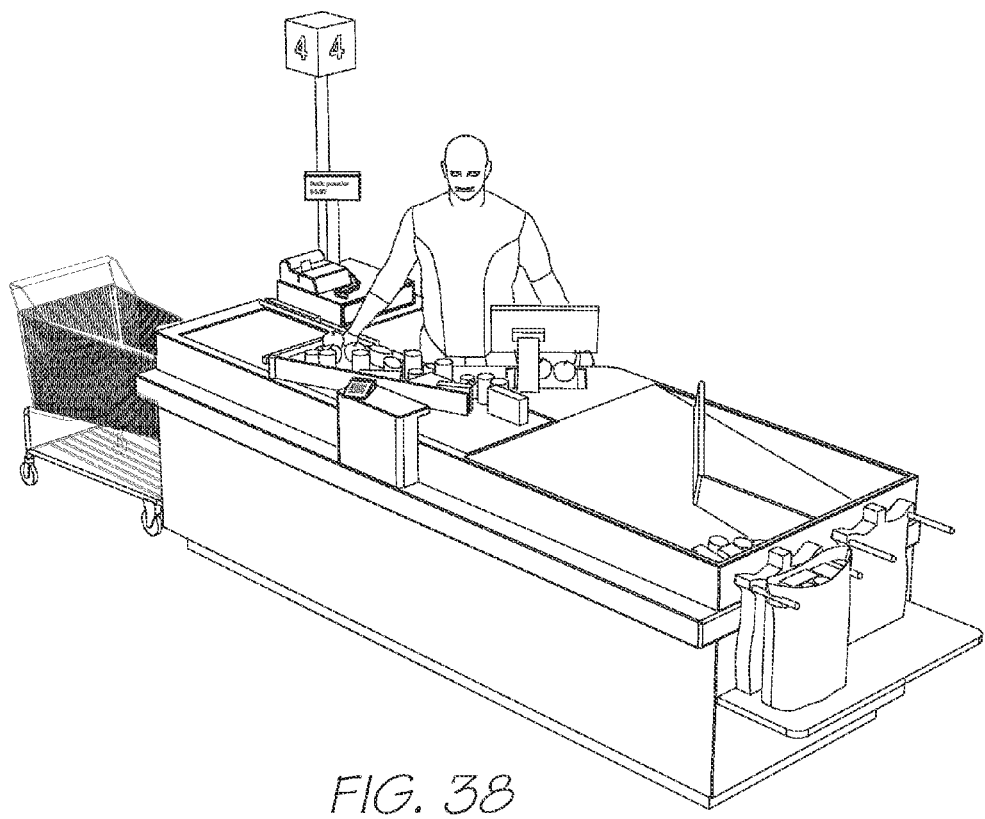
FIG. 38
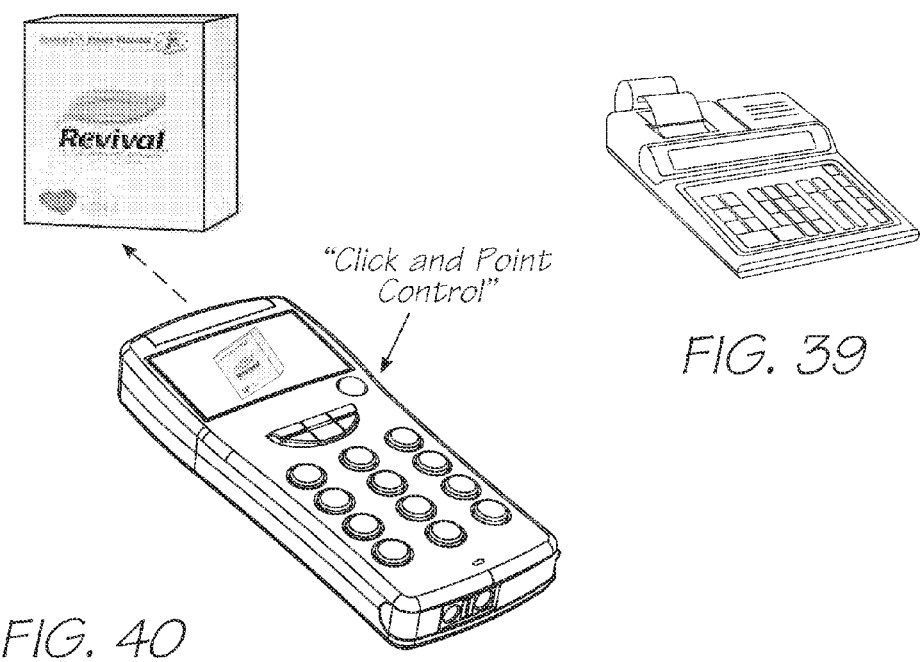
FIG. 39
FIG. 40
"Click and Point Control"

AUTHENTICATION OF PHARMACEUTICAL PRODUCTS

CROSS-REFERENCE TO RELATED APPLICATIONS

The present application is a continuation of U.S. application Ser. No. 11/041,627 filed on Jan. 25, 2005, now issued U.S. Pat. No. 7,537,157, the content of which is herein incorporated by reference.

CROSS-REFERENCES

Various methods, systems and apparatus relating to the present invention are disclosed in the following co-pending applications and granted patents filed by the applicant or assignee of the present invention. The disclosures of all of these co-pending applications and granted patents are incorporated herein by cross-reference.

| | | | | |
|---|---|---|---|---|
| 7,249,108 | 6,566,858 | 6,331,946 | 6,246,970 | 6,442,525 |
| 7,346,586 | 09/505,951 | 6,374,354 | 7,246,098 | 6,816,968 |
| 6,757,832 | 6,334,190 | 6,745,331 | 7,249,109 | 7,197,642 |
| 7,093,139 | 7,509,292 | 10/636,283 | 10/866,608 | 7,210,038 |
| 7,401,223 | 10/940,653 | 10/942,858 | 10/815,621 | 7,243,835 |
| 10/815,630 | 10/815,637 | 10/815,638 | 7,251,050 | 10/815,642 |
| 7,097,094 | 7,137,549 | 10/815,618 | 7,156,292 | 10/815,635 |
| 7,357,323 | 10/815,634 | 7,137,566 | 7,131,596 | 7,128,265 |
| 7,197,374 | 7,175,089 | 10/815,617 | 10/815,620 | 7,178,719 |
| 7,506,808 | 7,207,483 | 7,296,737 | 7,270,266 | 10/815,614 |
| 10/815,636 | 7,128,270 | 7,457,007 | 7,150,398 | 7,159,777 |
| 7,450,273 | 7,188,769 | 7,097,106 | 7,070,110 | 7,243,849 |
| 6,623,101 | 6,406,129 | 6,505,916 | 6,457,809 | 6,550,895 |
| 6,457,812 | 6,428,133 | 7,204,941 | 7,282,164 | 7,465,342 |
| 7,416,280 | 6,746,105 | 7,246,886 | 7,128,400 | 7,108,355 |
| 6,991,322 | 7,287,836 | 7,118,197 | 10/728,784 | 7,364,269 |
| 7,077,493 | 6,962,402 | 10/728,803 | 7,147,308 | 10/728,779 |
| 7,118,198 | 7,168,790 | 7,172,270 | 7,229,155 | 6,830,318 |
| 7,195,342 | 7,175,261 | 7,465,035 | 7,108,356 | 7,118,202 |
| 7,510,269 | 7,134,744 | 7,510,270 | 7,134,743 | 7,182,439 |
| 7,210,768 | 7,465,036 | 7,134,745 | 7,156,484 | 7,118,201 |
| 7,111,926 | 7,431,433 | 10/944,043 | 7,156,289 | 7,178,718 |
| 7,225,979 | 09/575,197 | 7,079,712 | 6,825,945 | 7,330,974 |
| 6,813,039 | 7,190,474 | 6,987,506 | 6,824,044 | 7,038,797 |
| 6,980,318 | 6,816,274 | 7,102,772 | 7,350,236 | 6,681,045 |
| 6,678,499 | 6,679,420 | 6,963,845 | 6,976,220 | 6,728,000 |
| 7,110,126 | 7,173,722 | 6,976,035 | 6,813,558 | 6,766,942 |
| 6,965,454 | 6,995,859 | 7,088,459 | 6,720,985 | 7,286,113 |
| 6,922,779 | 6,978,019 | 6,847,883 | 7,131,058 | 7,295,839 |
| 7,406,445 | 09/693,690 | 6,959,298 | 6,973,450 | 7,150,404 |
| 6,965,882 | 7,233,924 | 09/575,181 | 09/722,174 | 7,175,079 |
| 7,162,259 | 6,718,061 | 7,464,880 | 7,012,710 | 6,825,956 |
| 7,451,115 | 7,222,098 | 10/291,825 | 7,263,508 | 7,031,010 |
| 6,972,864 | 6,862,105 | 7,009,738 | 6,989,911 | 6,982,807 |
| 10/291,576 | 6,829,387 | 6,714,678 | 6,644,545 | 6,609,653 |
| 6,651,879 | 10/291,555 | 7,293,240 | 7,467,185 | 7,415,668 |
| 7,044,363 | 7,004,390 | 6,867,880 | 7,034,953 | 6,987,581 |
| 7,216,224 | 7,506,153 | 7,162,269 | 7,162,222 | 7,290,210 |
| 7,293,233 | 7,293,234 | 6,850,931 | 6,865,570 | 6,847,961 |
| 10/685,523 | 10/685,583 | 7,162,442 | 10/685,584 | 7,159,784 |
| 10/804,034 | 7,404,144 | 6,889,896 | 10/831,232 | 7,174,056 |
| 6,996,274 | 7,162,088 | 7,388,985 | 7,417,759 | 7,362,463 |
| 7,259,884 | 7,167,270 | 7,388,685 | 6,986,459 | 10/954,170 |
| 7,181,448 | 10/981,626 | 10/981,616 | 7,324,989 | 7,231,293 |
| 7,174,329 | 7,369,261 | 7,295,922 | 7,200,591 | 11/020,106 |
| 11/020,260 | 11/020,321 | 11/020,319 | 7,466,436 | 7,068,382 |
| 7,007,851 | 6,957,921 | 6,457,883 | 7,044,381 | 7,094,910 |
| 7,091,344 | 7,122,685 | 7,038,066 | 7,099,019 | 7,062,651 |
| 6,789,194 | 6,789,191 | 10/900,129 | 7,278,018 | 7,360,089 |
| 10/982,975 | 7,467,416 | 6,644,642 | 6,502,614 | 6,622,999 |
| 6,669,385 | 6,827,116 | 7,011,128 | 7,416,009 | 6,549,935 |
| 6,987,573 | 6,727,996 | 6,591,884 | 6,439,706 | 6,760,119 |
| 7,295,332 | 7,064,851 | 6,826,547 | 6,290,349 | 6,428,155 |
| 6,785,016 | 6,831,682 | 6,741,871 | 6,927,871 | 6,980,306 |
| 6,965,439 | 6,840,606 | 7,036,918 | 6,977,746 | 6,970,264 |
| 7,068,389 | 7,093,991 | 7,190,491 | 7,511,847 | 10/932,044 |
| 10/962,412 | 7,177,054 | 7,364,282 | 10/965,733 | 10/965,933 |
| 10/974,742 | 7,468,809 | 7,180,609 | 10/986,375 | 6,982,798 |
| 6,870,966 | 6,822,639 | 6,474,888 | 6,627,870 | 6,724,374 |
| 6,788,982 | 7,263,270 | 6,788,293 | 6,946,672 | 6,737,591 |
| 7,091,960 | 7,369,265 | 6,792,165 | 7,105,753 | 6,795,593 |
| 6,980,704 | 6,768,821 | 7,132,612 | 7,041,916 | 6,797,895 |
| 7,015,901 | 7,289,882 | 7,148,644 | 10/778,056 | 10/778,058 |
| 10/778,060 | 10/778,059 | 10/778,063 | 10/778,062 | 10/778,061 |
| 10/778,057 | 7,096,199 | 7,286,887 | 7,400,937 | 7,474,930 |
| 7,324,859 | 7,218,978 | 7,245,294 | 7,277,085 | 7,187,370 |
| 10/917,436 | 10/943,856 | 10/919,379 | 7,019,319 | 10/943,878 |
| 10/943,849 | 7,043,096 | 7,055,739 | 7,233,320 | 6,830,196 |
| 6,832,717 | 7,182,247 | 7,120,853 | 7,082,562 | 6,843,420 |
| 10/291,718 | 6,789,731 | 7,057,608 | 6,766,944 | 6,766,945 |
| 7,289,103 | 7,412,651 | 7,299,969 | 10/409,864 | 7,108,192 |
| 7,111,791 | 7,077,333 | 6,983,878 | 10/786,631 | 7,134,598 |
| 7,431,219 | 6,929,186 | 6,994,264 | 7,017,826 | 7,014,123 |
| 7,150,396 | 7,469,830 | 7,017,823 | 7,025,276 | 7,284,701 |
| 7,469,062 | 7,308,148 | 10/683,040 | 10/778,090 | 6,957,768 |
| 7,456,820 | 7,170,499 | 7,106,888 | 7,123,239 | 6,982,701 |
| 6,982,703 | 7,227,527 | 6,786,397 | 6,947,027 | 6,975,299 |
| 7,139,431 | 7,048,178 | 7,118,025 | 6,839,053 | 7,015,900 |
| 7,010,147 | 7,133,557 | 6,914,593 | 7,437,671 | 6,938,826 |
| 7,278,566 | 7,123,245 | 6,992,662 | 6,593,166 | 7,132,679 |
| 6,940,088 | 10/727,181 | 10/727,162 | 7,377,608 | 7,399,043 |
| 7,121,639 | 7,165,824 | 7,152,942 | 10/727,157 | 7,181,572 |
| 7,096,137 | 7,302,592 | 7,278,034 | 7,188,282 | 10/727,159 |
| 10/727,180 | 10/727,179 | 10/727,192 | 10/727,274 | 10/727,164 |
| 10/727,161 | 10/727,198 | 10/727,158 | 10/754,536 | 10/754,938 |
| 10/727,160 | 10/934,720 | 7,369,270 | 6,795,215 | 7,070,098 |
| 7,154,638 | 6,805,419 | 6,859,289 | 6,977,751 | 6,398,332 |
| 6,394,573 | 6,622,923 | 6,747,760 | 6,921,144 | 10/884,881 |
| 7,092,112 | 7,192,106 | 7,374,266 | 7,427,117 | 7,448,707 |
| 7,281,330 | 10/854,503 | 7,328,956 | 10/854,509 | 7,188,928 |
| 7,093,989 | 7,377,609 | 10/854,495 | 10/854,498 | 10/854,511 |
| 7,390,071 | 10/854,525 | 10/854,526 | 10/854,516 | 7,252,353 |
| 10/854,515 | 7,267,417 | 10/854,505 | 10/854,493 | 7,275,805 |
| 7,314,261 | 10/854,490 | 7,281,777 | 7,290,852 | 7,484,831 |
| 10/854,523 | 10/854,527 | 10/854,524 | 10/854,520 | 10/854,514 |
| 10/854,519 | 10/854,513 | 10/854,499 | 10/854,501 | 7,266,661 |
| 7,243,193 | 10/854,518 | 10/934,628 | 6,454,482 | 6,808,330 |
| 6,527,365 | 6,474,773 | 6,550,997 | 7,093,923 | 6,957,923 |
| 7,131,724 | 7,396,177 | 7,168,867 | 7,125,098 | |

Some application has been listed by docket numbers, these will be replaced when application number are known.

FIELD OF THE INVENTION

The present invention broadly relates to a method and apparatus for the protection of products and security documents using machine readable tags disposed on or in a surface of the product or security document.

BACKGROUND

Pharmaceutical Counterfeiting

The pharmaceutical industry is large, and it has continued to grow steadily with worldwide sales reaching US$400 billion in 2002. Around 20% of gross sales revenues are spent on R&D. The industry is also global, and its security structure is largely the result of the need to protect massive R&D investments. Many Governments are large buyers of pharmaceuticals in publicly-financed health care systems.

Pharmaceutical expenditure now represents about 15% of total health expenditure in Organization for Economic Co-operation and Development (OECD) nations. While trade and manufacturing activities are operating at an international level, national authorities take into account the position of their country within a global perspective when designing their national policies. There is also a need to balance global industry interests with concerns for public health and safety.

In this environment there is a need to improve security of the pharmaceutical supply chain through:

Global trade regulation through International Trade Agreements (ITAs),
Protection of R&D expenditure through patent activity, and
Concerns for public health and safety.

Global trade is regulated through ITAs and involves many public agencies pursuing multiple goals that relate to public health, industry and trade regulation, and security policies. The World Trade Organization (WTO) is therefore just one of the many organizations providing agreements of specific interest to the pharmaceutical industry.

The following Agreements highlight some of the WTO's key trade requirements now influencing the way the pharmaceutical industry is organized.

Agreement on Rules of Origin: The rules of origin are the criteria needed to determine the national origin of a product, and they are necessary because goods may be subject to different discriminatory measures depending on their origin. Rules of origin are the criteria needed to determine:

What imported products will receive most-favored nation treatment or preferential treatment,
When to implement measures and instruments of commercial policy such as anti-dumping duties and safeguard measures,
Trade statistics,
Labeling and ticketing requirements, and
Procedures for government procurement.

Agreement on Import Licensing Procedures: The agreement on import licensing procedures requires governments to publish sufficient information for traders to know how and why the licenses are granted. It also describes how countries should notify the WTO when they introduce new import licensing procedures, or change existing procedures.

Preshipment Inspection Agreement: The obligations that apply to governments which use preshipment inspections include:

Non-discrimination,
Transparency,
Protection of confidential business information,
Avoiding unreasonable delay,
The use of specific guidelines for conducting price verification, and
Avoiding conflicts of interest by the inspection agencies.

Agreement on Trade-Related Aspects of Intellectual Property Rights, Including Trade in Counterfeit Goods: The agreement recognizes that widely varying standards in the protection and enforcement of intellectual property rights. The lack of a multilateral framework of principles, rules and disciplines dealing with international trade in counterfeit goods has been a growing source of tension in international economic relations.

The above WTO provisions are just a few of the wide range of statutory and regulatory requirements now governing the international and domestic trade behaviour of the pharmaceutical industry. They also highlight the impending regulatory and statutory pressures likely to mandate the use of unique item identification.

An additional area that has always been of particular concern to the International AntiCounterfeiting Coalition (IACC) is the increasing availability of counterfeit products that have caused and continue to present threats to public health and safety. Given the heightened awareness of the past two years, the IACC's concerns with respect to public health and safety risk, have only increased. WHO estimates that counterfeit drugs account for ten percent of all pharmaceuticals, and of these 16% contain the wrong ingredients, with 60% having no active ingredients at all. That proportion of counterfeit drugs can rise to as high as 60% in developing countries.

In addition to using the pharmaceutical industry as a means to raise funds, the potential exists for terrorists to use the commission of the crime itself as a means of attack, for example by shipping counterfeit product containing deadly biotoxins. The United States Congress recognizes the increasing role of organized crime and terrorist activity in the theft of intellectual property through Trademark misuse and drug counterfeiting, and the threat that these pose for public health and safety. Proceeds are often used to fund more violent activities. The IACC have been tracking the influx of terrorist organizations into criminal and counterfeiting and there is now ample evidence to suggest that links exist.

It should also be noted here, that there is a significant overlap between security concerns and issues raised by the need to strengthen brand protection. It is simply not possible for the pharmaceutical industry to effectively address all of the security and brand protection concerns raised without adopting an automated unique item identification process to improve drug authentication, and to be able to actively monitor the physical flow of goods from its source to the customer.

In view of pressures for the pharmaceutical industry to address security and brand protection concerns, it becomes necessary to consider the adoption of new technologies. The two key capabilities required to improve overall efficiency and to protect the supply chain, are track and trace and product authentication.

While there are some compelling arguments supporting the introduction of track and trace, and product authentication solutions, there are also complexities that need to be addressed.

Two fundamental goals of the pharmaceutical industry are consumer care and public safety. To achieve these goals in the United States, the FDA and individual states regulate the industry through laws and administrative orders designed to protect the integrity of drugs throughout the pharmaceutical supply chain. Implicit in the laws is the administrative requirement for drug authentication and the ability to do track and trace.

Track and trace forms the foundation for improved patient safety by giving manufacturers, distributors and pharmacies a systemic method to detect and control counterfeiting, drug diversions and mishandling.

The introduction of track and trace capabilities also introduces the concept of a pedigree. Florida recently gained national attention by introducing a legislative bill to establish a pedigree for each drug sold in the State. Although this bill has not yet become law, its intention is to verify authenticity and reduce the risk of counterfeit items entering the supply chain. Specifically, the bill calls for the following pedigree information to accompany each drug through all steps of the supply chain:

Drug name,
Dosage,
Container size,
Number of containers,
Drug lots or control numbers,
Business name and address of all parties to each prior transaction, starting with the manufacturer, and
The date of each previous transaction.

Other countries have also moved forward with pedigree regulations. Most notably the Italian government, with financial support from the European Union, began to enforce the track and trace of pharmaceuticals with the Bollini Law in 2000. This law requires the use of a special sticker containing a serial number and a trace of all parties within the supply chain. However, this has created great difficulty for manufacturers and distributors. As a result, the full implementation of the law will not take place until June 2004 because of a lack of technology to handle the task of recording and archiving the serial numbers. An additional problem is that the design specifications of the database structure needed to support track and trace, have still not yet been determined.

Although the physical form of goods changes throughout manufacturing and distribution, a link still exists for all raw materials and the work processes used to produce the finished goods. This type of link demonstrates inheritance of specific attributes. Each medicine used by the patient has a specific lot number and expiration date printed on the container. The drug is shipped on a identifiable truck, at a particular temperature for a specific duration. The effectiveness of the medicine ultimately depends on the quality of the manufacturing process and the environmental conditions of transport and storage. These are all inherited attributes that form the pedigree.

Organizing the large number of informational links for all pharmaceutical product items in the supply chain becomes complex. To simplify product data management, two additional concepts are required. These are data aggregation and data inheritance.

Data inheritance is the history of the parent data. It is the logical equivalent of item aggregation or assembly. By viewing data within a supply chain as a series of parent-child relationships, track and trace becomes possible. To reconstruct the history of an item, each change in form must transfer from parent to child.

Data aggregation joins linked or like data together to reduce the number of readings at critical points within the supply chain, and thus making the capture of informational links needed for large-scale drug authentication, and track and trace, more feasible. If data aggregation were not possible, the identifiers for each product on the pallet would need to be read, resulting in a number of additional reads, especially when dealing with pallet level shipments.

To overcome the problems associated with the generation of a huge amount of product data, there is considerable interest in expanding or replacing the Universal Product Code (UPC) now in use for barcodes. In North America a product is typically identified by a 12-digit Universal Product Code (UPC), and in Europe and other regions by a 13-digit European Article Number (EAN) which are machine-readable product codes in the form of a printed 2D bar code. The Uniform Code Council (UCC) and EAN define and administer the UPC and related codes as subsets of the 14-digit Global Trade Item Number (GTIN).

The Auto-ID Center has defined a standard for mapping of the GTIN into the 96-bit Electronic Product Code (EPC) to help ensure compatibility between the EPC and current practices. The MIT Auto-ID Center has developed a standard for a 96-bit Electronic Product Code (EPC), coupled with an Internet-based Object Naming Service (ONS) and a Product Markup Language (PML). Once an EPC is scanned, it is used to look up, via the ONS, matching product information encoded in PML. The EPC consists of an 8-bit header, a 28-bit object class, and a 36-bit serial number. Although EPCs can be encoded in many physical forms, and carried over a range of interfaces, the Auto-ID Center strongly advocate the benefits of using low cost passive RFID tags to carry EPCs for individual item identification.

The appeal of an Auto-ID solution lies in the ability to use the EPC as a pointer to look up information about a drug that is contained in a remote database. The EPC acts as a persistent link to verify if the item has been legitimately obtained. This will act as a strong deterrent for fraud at many points along the supply chain. If and when a customer decides to return an item, or if there is a suspected problem with the contents, then there is a persistent link to information to validate product details. It prevents illegal returns, protects customers in the event of medical problems resulting from product use—or misuse—and it makes it possible to track customers and customized products that might be used by the wrong person and resulting in medical problems. Inventory control and reordering functions will be far more reliable.

The item's EPC serves as a key into a distributed PML database which records the characteristics of the item and its evolving history as it proceeds through the pharmaceutical supply chain. PML servers, located at each node of the supply chain, and secure Internet based communication combine to provide the primary handling structure and means. Tracking of higher level units (e.g. pallet or shipping company, dispatch/order number and transport route) in the supply chain is implicit. Readers installed at all transit entry and exit points can be used to automatically track movement and update dispatch logs at all points in the supply chain. Either the Internet or dedicated computer networks can provide the communication links.

The hardware components for an Auto-ID solution are technologically feasible with significant development having taken place during the past several years. A number of vendors are capable of producing key infrastructure components to meet the specific requirements of the pharmaceutical industry.

Besides the proposed applications in improving track and trace, and drug authentication, Auto-ID infrastructure also serves as the foundation for future applications of importance to the health care industry. For example, the Human Genome Project creates greater opportunities for engineering drugs to treat small groups of individuals that suffer from specific illnesses. These 'designer drugs' will be manufactured in small lot sizes on a make to order basis. In this environment, logistics and coordination takes on a new form as thousands of biotechnology drugs flood the pharmaceutical supply chain. Delivery of these new drugs to the right group of people presents a challenge that the current logistical system may not handle effectively.

However, this new capability does have drawbacks: The task of handling streaming information for the estimated 6 billion individual pharmaceutical items sold in the United States last year alone, taxes the capacity of the Internet or dedicated computer networks—even when the data aggregation and inheritance concepts are used. An additional complexity is that the Auto-ID approach would have to be fine-tuned in terms of information synchronisation among many different supply chain partners to ensure a high level of reliability for pedigree and drug authentication information. If a single supply chain partner did not properly handle information, pedigrees might show gaps that would raise counterfeit questions. The Auto-ID approach also assumes different entities within the pharmaceutical supply chain can achieve a common level of cooperation in supporting this information infrastructure.

A further difficulty to overcome is that the Auto-ID approach assumes that all drug manufacturers, carriers, wholesalers and pharmacies have the necessary hardware and computing ability to read and process EPC information. It is therefore unrealistic to believe that this capability will occur immediately.

Thus, it is likely that the pharmaceutical industry will continue to adopt an evolutionary approach to the standardisation of unique item identification technology throughout the manufacturing and supply chains. It is also likely that a range of technologies will need to be adopted and integrated to introduce incremental improvements in security and supply chain efficiency.

Currently two main types of technologies offering alternative methods of unique product item identification, such as EPCs, namely:

2D optical barcodes, and

Radio Frequency Identification tags (RFID).

A 2D optical barcode consists of a composite image that can store about 2,000 bytes of data along two dimensions. The Uniform Code Council and European Article Numbering (EAN) International have standardized a range of 2D barcodes, all with a significantly larger data capacity than the existing EPC.

2D optical barcodes are now widely used in the global pharmaceutical industry. In the United States, the Food and Drug Administration (FDA) has mandated their use on all pharmaceutical goods manufactured within its jurisdiction to identify product lines. The main advantage driving their acceptance is that they are inexpensive to produce.

The main disadvantage of 2D optical barcodes is that they are often difficult to read due to label damage and a direct 'line-of-sight' is needed for scanning. In addition to this, 2-D optical barcodes are unsightly and therefore detrimental to the packaging of the product. This problem is exacerbated in the case of pharmaceuticals, which generally use small packaging, but require a relatively large bar-code which can therefore obscure a substantial part of the packaging.

An RFID tag is a technology that incorporates the use of electromagnetic or electrostatic coupling to uniquely identify an object. It consists of three parts: antenna, transceiver, and transponder.

In the case of Pharmaceuticals RFID tags provide unique product item identification encoded in the form of an EPC. The pharmaceutical industry recognizes the many advantages of introducing accurate and reliable unique item identification technology. The expected advantages include:

Dramatically eliminate inventory loss and write-offs due to 'shrinkage',

Improve productivity in dispatch and receiving of goods,

Significantly reduce the time required to identify the location of products for recall if required, Provide an efficient basis for satisfying regulatory requirements, Increase assurance of shipment accuracy, and therefore reduce the number of customer complaints, and Provide a lot and expiration date tracking capability.

RFID tracking could be automated to help improve the integrity of the pharmaceutical supply chain. By identifying and tracking products in the supply chain, companies can maintain a much tighter control over legitimate shipments, and ensure that they are not hijacked or stolen. This can prevent products from falling into the hands of counterfeiters, who could dilute or alter the drugs, and then distribute them to unsuspecting pharmacies and customers. For this reason, many major pharmaceutical companies, such as Johnson & Johnson and Eli Lilly and Company, are now exploring the possibility of using RFID tags on all drug shipments.

There are also regulatory requirements driving the adoption of RFID technologies. The FDA plays a lead role in providing a forum and guidance for new technology adoption and is actively encouraging the implementation of ways to authenticate prescription drugs through the supply chain to ensure compliance and patient safety. Working with pharmaceutical companies and vendors of anti-counterfeit security systems, the FDA identifies technologies that are able to protect the industry against various threats to customers and brand protection. Although it does not specify which technologies are able to respond to the identified threats, it does specify the security features that need to be employed on the product packaging and shipping materials. The Healthcare Distribution Management Association (HDMA) has also recommended that pharmaceutical manufacturers and wholesalers use product identifiers on cases by 2005, and that RFID tags at item level should be deployed by 2007.

Recently, the FDA has published a proposed rule referred to as 'Bar Code Label Requirements for Human Drug Products and Blood FDA Proposed Rule (14 Mar. 2003). *Bar Code Label Requirements for Human Drug Products and Blood*, Federal Register (Vol. 68, No. 50) pp. 12499-12534. The proposed rule will require pharmaceutical companies to identify each drug, and dosage using linear barcodes. The need to include lot number and expiration dates are still under consideration. Although the benefits of using unique item identification are now being considered, this is not likely for some time as at present there are no suitable solutions available.

However, in addition to the forecast benefits and regulatory pressures for RFID use, there are also some disadvantages that make RFID tags unsuitable for some pharmaceutical products.

First, RFID tags are costly to produce. The current cost of producing an RFID is around 30-50 cents. While this cost can be significantly reduced once high production volumes and wide acceptance have been achieved, it is unlikely that the cost will fall below 5 cents per RFID tag in the foreseeable future. There are also some additional costs associated with integrating the RFID tags into packaging and labeling.

A further problem is that the presence of metals, liquids and other electromagnetic frequency (EMF) signals can interfere with RFID tag scanners, and thus seriously jeopardize the reliability and integrity of the RFID system. In the pharmaceutical industry, many radiopaque materials are used in both the content and containers of goods. To overcome this problem for RFID systems, it is necessary to split individual boxes of goods so that they can be conveyed past RFID tag readers, making dock-to-dock transfers more time-consuming. These restrictions will also apply at item level at the point-of-sale (POS). This alone would make them unsuitable for large-scale deployment.

A third disadvantage of RFID tags concerns customer privacy. If, for example, a terminally ill cancer patient collected their RFID tagged morphine sulphate prescription, then it might be possible for a person to illegally use a scanning device to detect the nature of the contents by reading an RFID tag without the knowledge of the owner. Knowing the contents, that person may then decide to steal the goods. However, the risk can be reduced by ensuring that once an item has gone to a customer, access to information over the network is then dynamically altered and secured to protect personal information or product details. This could be done using virtual customer records that comply with emerging standards for managing and securing patient information folders (PIFs) for the healthcare system.

Collectively, these disadvantages mean that it is unlikely that RFID tags will ever become suitable for all pharmaceutical or therapeutic items, and as such will only ever be able to be deployed as an alternative technology and adopted alongside some other form of product identification system.

Surface Coding Background

The Netpage surface coding consists of a dense planar tiling of tags. Each tag encodes its own location in the plane. Each tag also encodes, in conjunction with adjacent tags, an identifier of the region containing the tag. This region ID is unique among all regions. In the Netpage system the region typically corresponds to the entire extent of the tagged surface, such as one side of a sheet of paper.

The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data. The surface coding therefore allows a sensing device to acquire a region ID and a tag position during a purely local interaction with a coded surface, e.g. during a "click" or tap on a coded surface with a pen.

The use of netpage surface coding is described in more detail in the following copending patent applications, U.S. Ser. No. 10/815,647 (docket number HYG001US), entitled "Obtaining Product Assistance" filed on 2 Apr. 2004; and U.S. Ser. No. 10/815,609 (docket number HYT001US), entitled "Laser Scanner Device for Printed Product Identification Code" filed on 2 Apr. 2004.

Cryptography Background

Cryptography is used to protect sensitive information, both in storage and in transit, and to authenticate parties to a transaction. There are two classes of cryptography in widespread use: secret-key cryptography and public-key cryptography.

Secret-key cryptography, also referred to as symmetric cryptography, uses the same key to encrypt and decrypt a message. Two parties wishing to exchange messages must first arrange to securely exchange the secret key.

Public-key cryptography, also referred to as asymmetric cryptography, uses two encryption keys. The two keys are mathematically related in such a way that any message encrypted using one key can only be decrypted using the other key. One of these keys is then published, while the other is kept private. They are referred to as the public and private key respectively. The public key is used to encrypt any message intended for the holder of the private key. Once encrypted using the public key, a message can only be decrypted using the private key. Thus two parties can securely exchange messages without first having to exchange a secret key. To ensure that the private key is secure, it is normal for the holder of the private key to generate the public-private key pair.

Public-key cryptography can be used to create a digital signature. If the holder of the private key creates a known hash of a message and then encrypts the hash using the private key, then anyone can verify that the encrypted hash constitutes the "signature" of the holder of the private key with respect to that particular message, simply by decrypting the encrypted hash using the public key and verifying the hash against the message. If the signature is appended to the message, then the recipient of the message can verify both that the message is genuine and that it has not been altered in transit.

Secret-key can also be used to create a digital signature, but has the disadvantage that signature verification can also be performed by a party privy to the secret key.

To make public-key cryptography work, there has to be a way to distribute public keys which prevents impersonation. This is normally done using certificates and certificate authorities. A certificate authority is a trusted third party which authenticates the association between a public key and a person's or other entity's identity. The certificate authority verifies the identity by examining identity documents etc., and then creates and signs a digital certificate containing the identity details and public key. Anyone who trusts the certificate authority can use the public key in the certificate with a high degree of certainty that it is genuine. They just have to verify that the certificate has indeed been signed by the certificate authority, whose public key is well-known.

To achieve comparable security to secret-key cryptography, public-key cryptography utilises key lengths an order of magnitude larger, i.e. a few thousand bits compared with a few hundred bits.

Schneier B. (*Applied Cryptography*, Second Edition, John Wiley & Sons 1996) provides a detailed discussion of cryptographic techniques.

SUMMARY OF THE INVENTION

In accordance with the present invention there is provided method for authenticating a pharmaceutical product item, the pharmaceutical product item being associated with packaging having disposed thereon or therein coded data including a number of coded data portions, each coded data portion being indicative of an identity of the pharmaceutical product item and a part of a signature, the signature being a digital signature of at least part of the identity, the signature comprising a plurality of signature parts, the method comprising the steps of:

receiving indicating data from a sensing device, the sensing device being responsive to sensing the coded data to generate indicating data at least partially indicative of:
the identity of the pharmaceutical product item;
the signature part; and
a signature part identifier;
determining, from the received identity and the received signature part identifier, a determined signature part;
authenticating the pharmaceutical product item by comparing the received signature part and the determined signature part.

Other aspects are also provided.

BRIEF DESCRIPTION OF THE DRAWINGS

An example of the present invention will now be described with reference to the accompanying drawings, in which:

FIG. 38. is an example of a Hyperlabel supermarket checkout;

FIG. 39. is an example of a cash register;

FIG. 40. is an example of a handheld validity scanner.

DETAILED DESCRIPTION OF THE DRAWINGS

The Netpage surface coding consists of a dense planar tiling of tags. Each tag encodes its own location in the plane. Each tag also encodes, in conjunction with adjacent tags, an identifier of the region containing the tag. In the Netpage system, the region typically corresponds to the entire extent of the tagged surface, such as one side of a sheet of paper.

Hyperlabel is the adaptation of the Netpage tags for use in unique item identification for a wide variety of applications, including security document protection, object tracking, pharmaceutical security, supermarket automation, interactive product labels, web-browsing from printed surfaces, paper based email, and many others.

Using Memjet™ digital printing technology (which is the subject of a number of pending U.S. patent applications including U.S. Ser. No. 10/407,212), Hyperlabel tags are printed over substantially an entire surface, such as a security document, bank note, or pharmaceutical packaging, using infrared (IR) ink. By printing the tags in infrared-absorptive ink on any substrate which is infra-red-reflective, the near-infrared wavelengths, and hence the tags are invisible to the human eye but are easily sensed by a solid-state image sensor with an appropriate filter. This allows machine readable information to be encoded over a large portion of the note or other surface, with no visible effect on the original note text or graphics thereon. A scanning laser or image sensor can read the tags on any part of the surface to performs associated actions, such as validating each individual note or item.

Figure 1:
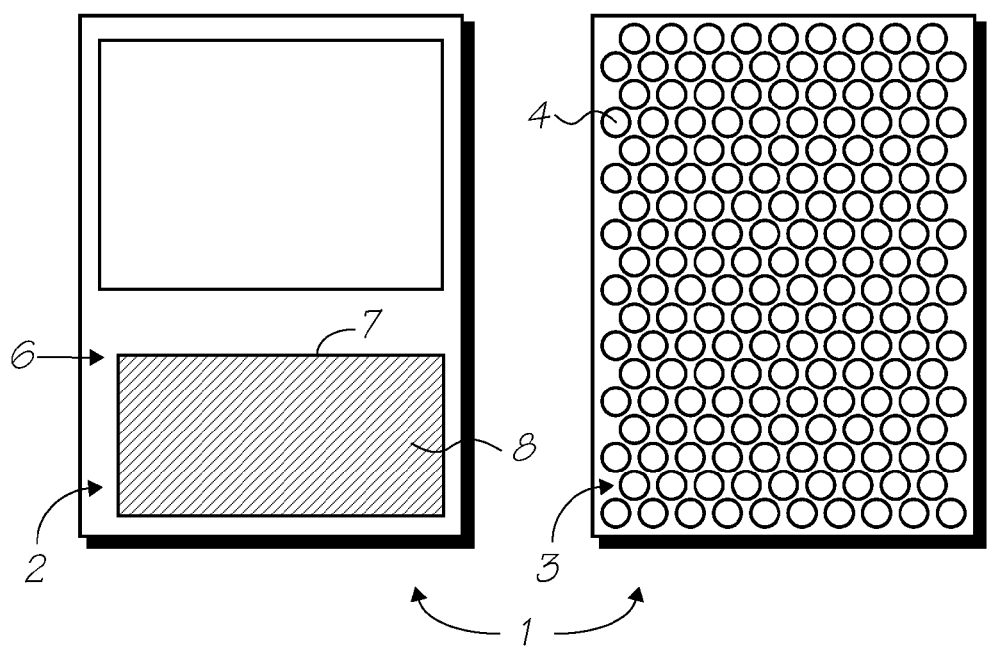
FIG. 1 is an example of a document including Hyperlabel encoding.

An example of such a hyperlabel encoded document, is shown in FIG. 1. In this example, the hyperlabel document consists of graphic data 2 printed using visible ink, and coded data 3 formed from hyperlabel tags 4. The document includes an interactive element 6 defined by a zone 7 which corresponds to the spatial extent of a corresponding graphic 8. In use, the tags encode tag data including an ID. By sensing at least one tag, and determining and interpreting the encoded ID using an appropriate system, this allows the associated actions to be performed.

In one example, a tag map is used to define a layout of the tags on the hyperlabel document based on the ID encoded within the tag data. The ID can also be used to reference a document description which describes the individual elements of the hyperlabel document, and in particular describes the type and spatial extent (zone) of interactive elements, such as a button or text field. Thus, in this example, the element 6 has a zone 7 which corresponds to the spatial extent of a corresponding graphic 8. This allows a computer system to interpret interactions with the hyperlabel document.

In position indicating techniques, the ID encoded within the tag data of each tag allows the exact position of the tag on the hyperlabel document to be determined from the tag map. The position can then be used to determine whether the sensed tag is positioned in a zone of an interactive element from the document description.

In object indicating techniques, the ID encoded within the tag data allows the presence of the tag in a region of the document to be determined from the tag map (the relative position of the tag within the region may also be indicated). In this case, the document description can be used to determine whether the region corresponds to the zone of an interactive element.

An example of this process will now be described with reference to FIGS. 2 and 3 which show how a sensing device in the form of a netpage or hyperlabel pen 101, which interacts with the coded data on a printed hyperlabel document 1, such as a security document, label, product packaging or the like.

The hyperlabel pen 101 senses a tag using an area image sensor and detects tag data. The hyperlabel pen 101 uses the sensed coded data to generate interaction data which is transmitted via a short-range radio link 9 to a relay 44, which may form part of a computer 75 or a printer 601. The relay sends the interaction data, via a network 19, to a document server 10, which uses the ID to access the document description, and interpret the interaction. In appropriate circumstances, the document server sends a corresponding message to an application server 13, which can then perform a corresponding action.

In an alternative embodiment, the PC, Web terminal, netpage printer or relay device may communicate directly with local or remote application software, including a local or remote Web server. Relatedly, output is not limited to being printed by the netpage printer. It can also be displayed on the PC or Web terminal, and further interaction can be screen-based rather than paper-based, or a mixture of the two.

Typically hyperlabel pen users register with a registration server 11, which associates the user with an identifier stored in the respective hyperlabel pen. By providing the sensing device identifier as part of the interaction data, this allows users to be identified, allowing transactions or the like to be performed.

Hyperlabel documents are generated by having an ID server generate an ID which is transferred to the document server 10. The document server 10 determines a document description and then records an association between the document description and the ID, to allow subsequent retrieval of the document description using the ID.

The ID is then used to generate the tag data, as will be described in more detail below, before the document is printed by the hyperlabel printer 601, using the page description and the tag map.

Each tag is represented by a pattern which contains two kinds of elements. The first kind of element is a target. Targets allow a tag to be located in an image of a coded surface, and allow the perspective distortion of the tag to be inferred. The second kind of element is a macrodot. Each macrodot encodes the value of a bit by its presence or absence.

The pattern is represented on the coded surface in such a way as to allow it to be acquired by an optical imaging system, and in particular by an optical system with a narrowband response in the near-infrared. The pattern is typically printed onto the surface using a narrowband near-infrared ink.

In the Hyperlabel system the region typically corresponds to the surface of an entire product item, or to a security document, and the region ID corresponds to the unique item ID. For clarity in the following discussion we refer to items and item IDs (or simply IDs), with the understanding that the item ID corresponds to the region ID.

The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data. The surface coding therefore allows a sensing device to acquire a region ID and a tag position during a purely local interaction with a coded surface, e.g. during a "click" or tap on a coded surface with a pen.

A wide range of different tag structures can be used, and some examples will now be described.

First Example Tag Structure

Figure 4:
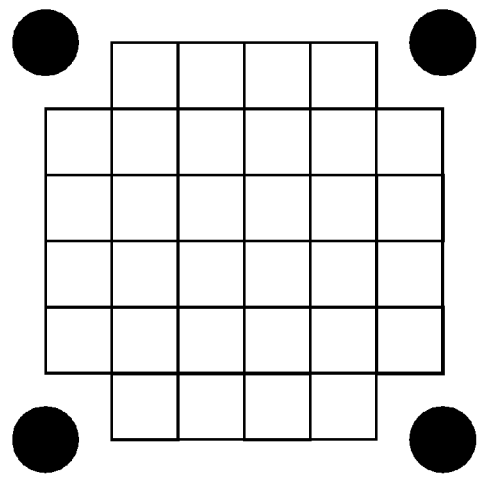
FIG. 4. is a first example of a tag structure.

FIG. 4 shows the structure of a complete tag. Each of the four black circles is a target. The tag, and the overall pattern, has four-fold rotational symmetry at the physical level.

Each square region represents a symbol, and each symbol represents four bits of information.

Figure 5:
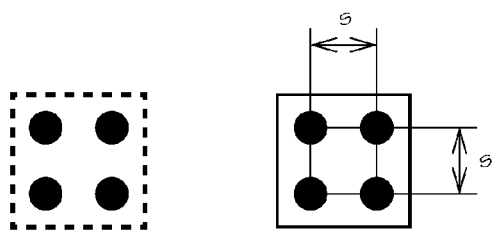
FIG. 5. is an example of a symbol unit cell for the tag structure of FIG. 4.

FIG. 5 shows the structure of a symbol. It contains four macrodots, each of which represents the value of one bit by its presence (one) or absence (zero).

The macrodot spacing is specified by the parameter s throughout this document. It has a nominal value of 143 μm, based on 9 dots printed at a pitch of 1600 dots per inch. However, it is allowed to vary by ±10% according to the capabilities of the device used to produce the pattern.

Figure 6:
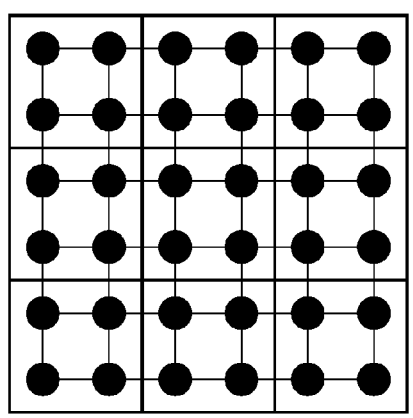
FIG. 6. is an example of an array of the symbol unit cells of FIG. 5.

FIG. 6 shows an array of nine adjacent symbols. The macrodot spacing is uniform both within and between symbols.

Figure 7:
FIG. 7. is an example of symbol bit ordering in the unit cells of FIG. 5.

FIG. 7 shows the ordering of the bits within a symbol. Bit zero is the least significant within a symbol; bit three is the most significant. Note that this ordering is relative to the orientation of the symbol. The orientation of a particular symbol within the tag is indicated by the orientation of the label of the symbol in the tag diagrams. In general, the orientation of all symbols within a particular segment of the tag have the same orientation, consistent with the bottom of the symbol being closest to the centre of the tag.

Figure 8:
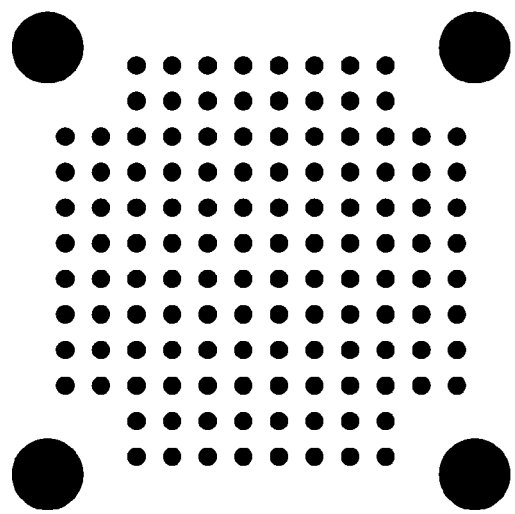
FIG. 8. is an example of the tag structure of FIG. 4 with every bit set.

Only the macrodots are part of the representation of a symbol in the pattern. The square outline of a symbol is used in this document to more clearly elucidate the structure of a tag. FIG. 8, by way of illustration, shows the actual pattern of a tag with every bit set. Note that, in practice, every bit of a tag can never be set.

A macrodot is nominally circular with a nominal diameter of (5/9)s. However, it is allowed to vary in size by ±10% according to the capabilities of the device used to produce the pattern.

A target is nominally circular with a nominal diameter of (17/9)s. However, it is allowed to vary in size by ±10% according to the capabilities of the device used to produce the pattern.

The tag pattern is allowed to vary in scale by up to ±10% according to the capabilities of the device used to produce the pattern. Any deviation from the nominal scale is recorded in the tag data to allow accurate generation of position samples.

Each symbol shown in the tag structure in FIG. 4 has a unique label. Each label consists an alphabetic prefix and a numeric suffix.

Tag Group

Figure 9:
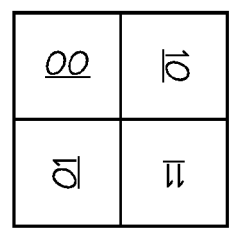
FIG. 9. is an example of tag types within a tag group for the tag structure of FIG. 4.

Tags are arranged into tag groups. Each tag group contains four tags arranged in a square. Each tag therefore has one of four possible tag types according to its location within the tag group square. The tag types are labelled 00, 10, 01 and 11, as shown in FIG. 9.

Each tag in the tag group is rotated as shown in the figure, i.e. tag type 00 is rotated 0 degrees, tag type 10 is rotated 90 degrees, tag type 11 is rotated 180 degrees, and tag type 01 is rotated 270 degrees.

Figures 10, 11:
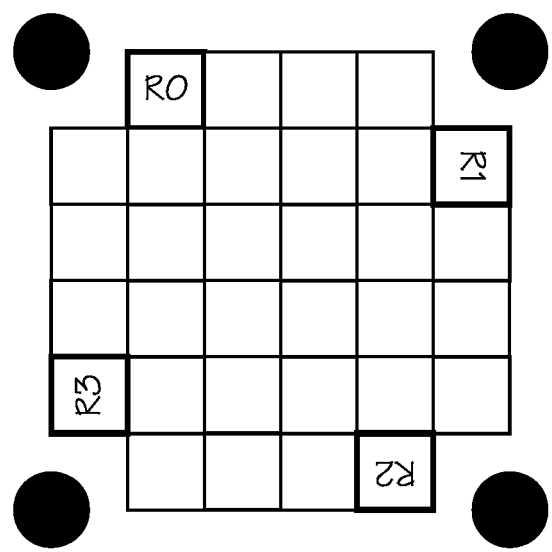
FIG. 10. is an example of continuous tiling of the tag groups of FIG. 9.
FIG. 11. is an example of the orientation-indicating cyclic position codeword R for the tag group of FIG. 4.

FIG. 10 shows how tag groups are repeated in a continuous tiling of tags. The tiling guarantees the any set of four adjacent tags contains one tag of each type.

Orientation-Indicating Cyclic Position Code

The tag contains a $2^4$-ary (4, 1) cyclic position codeword which can be decoded at any of the four possible orientations of the tag to determine the actual orientation of the tag. Symbols which are part of the cyclic position codeword have a prefix of "R" and are numbered 0 to 3 in order of increasing significance.

The cyclic position codeword is (0, 7, 9, $E_{16}$). Note that it only uses four distinct symbol values, even though a four-bit symbol has sixteen possible values. During decoding, any unused symbol value should, if detected, be treated as an erasure. To maximise the probability of low-weight bit error patterns causing erasures rather than symbol errors, the symbol values are chosen to be as evenly spaced on the hypercube as possible.

The minimum distance of the cyclic position code is 4, hence its error-correcting capacity is one symbol in the presence of up to one erasure, and no symbols in the presence of two or more erasures.

The layout of the orientation-indicating cyclic position codeword is shown in FIG. 11.

Local Codeword

The tag locally contains one complete codeword which is used to encode information unique to the tag. The codeword is of a punctured $2^4$-ary (13, 7) Reed-Solomon code. The tag therefore encodes up to 28 bits of information unique to the tag.

Figure 12:
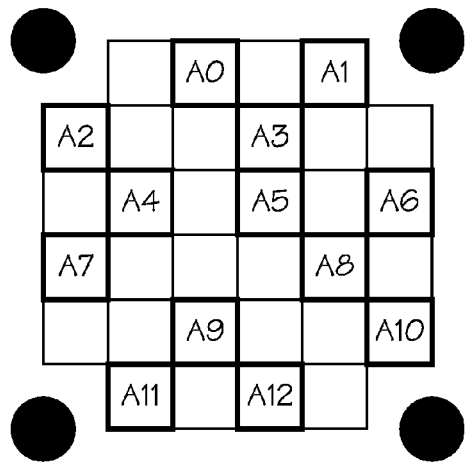
FIG. 12. is an example of a local codeword A for the tag group of FIG. 4.

The layout of the local codeword is shown in FIG. 12.

Distributed Codewords

The tag also contains fragments of four codewords which are distributed across the four adjacent tags in a tag group and which are used to encode information common to a set of contiguous tags. Each codeword is of a $2^4$-ary (15, 11) Reed-Solomon code. Any four adjacent tags therefore together encode up to 176 bits of information common to a set of contiguous tags.

Figure 13:
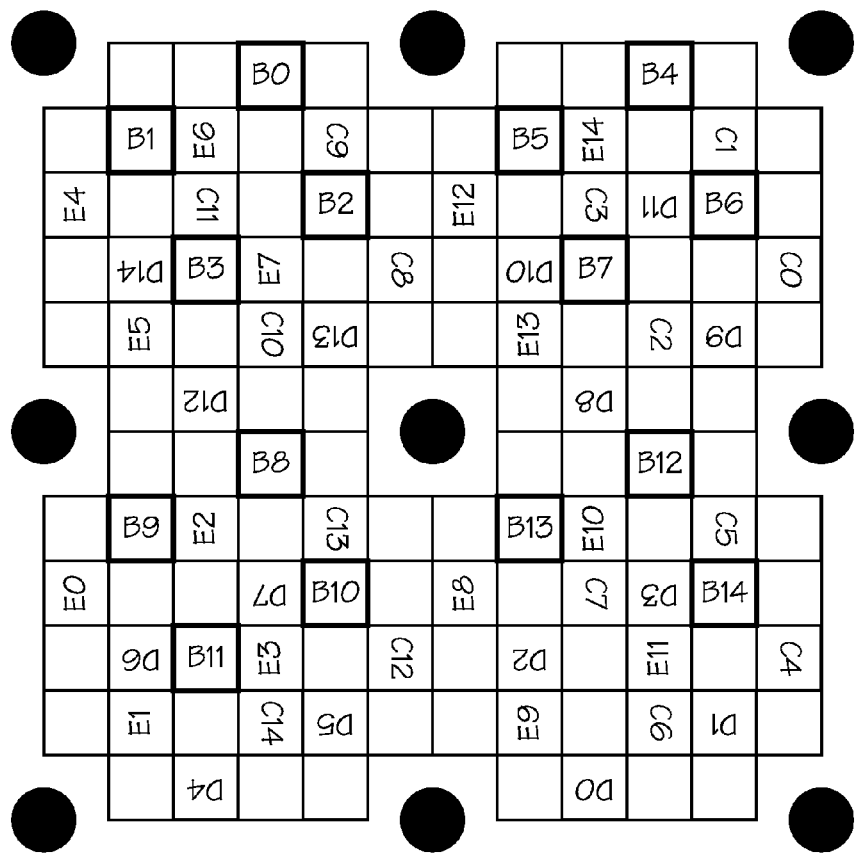
FIG. 13. is an example of distributed codewords B, C, D and E, for the tag group of FIG. 4.

The layout of the four complete codewords, distributed across the four adjacent tags in a tag group, is shown in FIG. 13. The order of the four tags in the tag group in FIG. 13 is the order of the four tags in FIG. 9.

Figure 14:
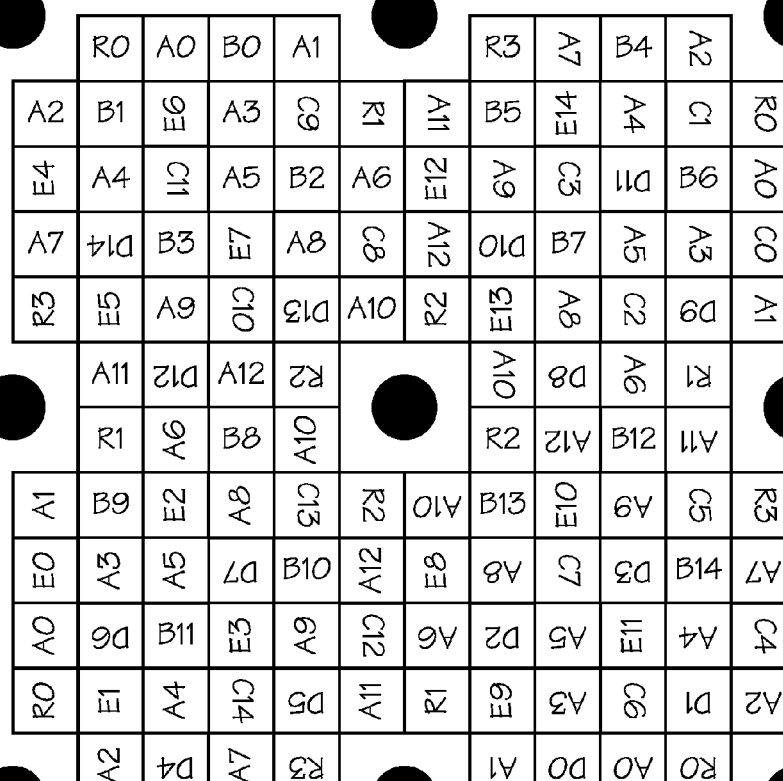
FIG. 14. is an example of a layout of complete tag group.

FIG. 14 shows the layout of a complete tag group.

Reed-Solomon Encoding

Local Codeword

The local codeword is encoded using a punctured $2^4$-ary (13, 7) Reed-Solomon code. The code encodes 28 data bits (i.e. seven symbols) and 24 redundancy bits (i.e. six symbols) in each codeword. Its error-detecting capacity is six symbols. Its error-correcting capacity is three symbols.

Figure 15:
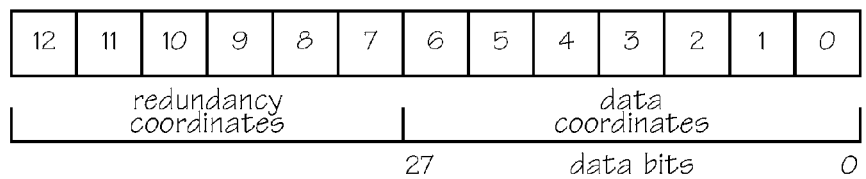
FIG. 15. is an example of a code word for the tag group of FIG. 4.

As shown in FIG. 15, codeword coordinates are indexed in coefficient order, and the data bit ordering follows the codeword bit ordering.

The code is a $2^4$-ary (15, 7) Reed-Solomon code with two redundancy coordinates removed. The removed coordinates are the most significant redundancy coordinates.

The code has the following primitive polynominal:

$$p(x)=x^4+x+1 \quad (EQ\ 1)$$

The code has the following generator polynominal:

$$g(x)=(x+\alpha)(x+\alpha^2)\ldots(x+\alpha^8) \quad (EQ\ 2)$$

Distributed Codewords

The distributed codewords are encoded using a $2^4$-ary (15, 11) Reed-Solomon code. The code encodes 44 data bits (i.e. eleven symbols) and 16 redundancy bits (i.e. four symbols) in each codeword. Its error-detecting capacity is four symbols. Its error-correcting capacity is two symbols.

Codeword coordinates are indexed in coefficient order, and the data bit ordering follows the codeword bit ordering.

The code has the same primitive polynominal as the local codeword code.

The code has the following generator polynominal:

$$g(x)=(x+\alpha)(x+\alpha^2)\ldots(x+\alpha^4) \quad (EQ\ 3)$$

Tag Coordinate Space

The tag coordinate space has two orthogonal axes labelled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags. By convention, the position is taken to be the position of the centre of the target closest to the origin.

Tag Information Content

Field Definitions

Table 1 defines the information fields embedded in the surface coding. Table 2 defines how these fields map to codewords.

TABLE 1

Field definitions

| field | width (bits) | description |
| --- | --- | --- |
| per tag | | |
| x coordinate | 9 or 13 | The unsigned x coordinate of the tag allows maximum coordinate values of approximately 0.9 m and 14 m respectively. |
| y coordinate | 9 or 13 | The unsigned y coordinate of the tag allows maximum coordinate values of approximately 0.9 m and 14 m respectively |
| active area flag | 1 | b'1' indicates whether the area (the diameter of the area ntered on the tag, is nominally 5 times the diagonal size of the tag) immediately surrounding the tag intersects an active area |
| data fragment flag | 1 | A flag indicating whether a data fragment is present (see next field). b'1' indicates the presence of a data fragment. If the data fragment is present then the width of the x and y coordinate fields is 9. If it is absent then the width is 13. |
| data fragment per tag group (i.e. per region) | 0 or 8 | A fragment of an embedded data stream. |
| encoding format | 8 | The format of the encoding. 0: the present encoding Other values are reserved. |
| region flags | 8 | Flags controlling the interpretation of region data. 0: region ID is an EPC 1: region has signature 2: region has embedded data 3: embedded data is signature Other bits are reserved and must be zero. |
| tag size ID | 8 | The ID of the tag size. 0: the present tag size the nominal tag size is 1.7145 mm, based on 1600 dpi, 9 dots per macrodot, and 12 macrodots per tag Other values are reserved. |
| region ID | 96 | The ID of the region containing the tags. |
| signature | 36 | The signature of the region. |
| high-order coordinate width (w) | 4 | The width of the high-order part of the x and y coordinates of the tag. |
| high-order x coordinate | 0 to 15 | High-order part of the x coordinate of the tag expands the maximum coordinate values to approximately 2.4 km and 38 km respectively |
| high-order y coordinate | 0 to 15 | High-order part of the y coordinate of the tag expands the maximum coordinate values to approximately 2.4 km and 38 km respectively. |
| CRC | 16 | A CRC of tag group data. |

An active area is an area within which any captured input should be immediately forwarded to the corresponding hyperlabel server for interpretation. This also allows the hyperlabel server to signal to the user that the input has had an immediate effect. Since the server has access to precise region definitions, any active area indication in the surface coding can be imprecise so long as it is inclusive.

The width of the high-order coordinate fields, if non-zero, reduces the width of the signature field by a corresponding number of bits. Full coordinates are computed by prepending each high-order coordinate field to its corresponding coordinate field.

TABLE 2

Mapping of fields to codewords

| codeword | codeword bits | field | width | field bits |
|---|---|---|---|---|
| A | 12:0 | x coordinate | 13 | all |
|  | 12:9 | data fragment | 4 | 3:0 |
|  | 25:13 | y coordinate | 13 | all |
|  | 25:22 | data fragment | 4 | 7:4 |
|  | 26 | active area flag | 1 | all |
|  | 27 | data fragment flag | 1 | all |
| B | 7:0 | encoding format | 8 | all |
|  | 15:8 | region flags | 8 | all |
|  | 23:16 | tag size ID | 8 | all |
|  | 39:24 | CRC | 16 | all |
|  | 43:40 | high-order coordinate width (w) | 4 | 3:0 |
| C | 35:0 | signature | 36 | all |
|  | (35 − w):(36 − 2w) | high-order x coordinate | w | all |
|  | 35:(36 − w) | high-order y coordinate | w | all |
|  | 43:36 | region ID | 8 | 7:0 |
| D | 43:0 | region ID | 44 | 51:8 |
| E | 43:0 | region ID | 44 | 95:52 |

Embedded Data

If the "region has embedded data" flag in the region flags is set then the surface coding contains embedded data. The data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 3, a 200-bit data block encodes 160 bits of data. The block data is encoded in the data fragments of a contiguous group of 25 tags arranged in a 5×5 square. A tag belongs to a block whose integer coordinate is the tag's coordinate divided by 5. Within each block the data is arranged into tags with increasing x coordinate within increasing y coordinate.

A data fragment may be missing from a block where an active area map is present. However, the missing data fragment is likely to be recoverable from another copy of the block.

Data of arbitrary size is encoded into a superblock consisting of a contiguous set of blocks arranged in a rectangle. The size of the superblock is encoded in each block. A block belongs to a superblock whose integer coordinate is the block's coordinate divided by the superblock size. Within each superblock the data is arranged into blocks with increasing x coordinate within increasing y coordinate.

The superblock is replicated in the surface coding as many times as it will fit, including partially along the edges of the surface coding.

The data encoded in the superblock may include more precise type information, more precise size information, and more extensive error detection and/or correction data.

TABLE 3

Embedded data block

| field | width | description |
|---|---|---|
| data type | 8 | The type of the data in the superblock. Values include: 0: type is controlled by region flags 1: MIME Other values are TBA. |
| superblock width | 8 | The width of the superblock, in blocks. |
| superblock height | 8 | The height of the superblock, in blocks. |
| data | 160 | The block data. |
| CRC | 16 | A CRC of the block data. |
| total | 200 | |

It will be appreciated that any form of embedded data may be used, including for example, text, image, audio, video data, such as product information, application data, contact data, business card data, and directory data.

Region Signatures

If the "region has signature" flag in the region flags is set then the signature field contains a signature with a maximum width of 36 bits. The signature is typically a random number associated with the region ID in a secure database. The signature is ideally generated using a truly random process, such as a quantum process, or by distilling randomness from random events.

In an online environment the signature can be validated, in conjunction with the region ID, by querying a server with access to the secure database.

If the "region has embedded data" and "embedded data is signature" flags in the region flags are set then the surface coding contains a 160-bit cryptographic signature of the region ID. The signature is encoded in a one-block superblock.

In an online environment any number of signature fragments can be used, in conjunction with the region ID and optionally the random signature, to validate the signature by querying a server with knowledge of the full signature or the corresponding private key.

In an offline (or online) environment the entire signature can be recovered by reading multiple tags, and can then be validated using the corresponding public signature key.

Signature verification is discussed in more detail below.

MIME Data

If the embedded data type is "MIME" then the superblock contains Multipurpose Internet Mail Extensions (MIME) data according to RFC 2045 (Freed, N., and N. Borenstein, "Multipurpose Internet Mail Extensions (MIME)—Part One: Format of Internet Message Bodies", RFC 2045, November 1996), RFC 2046 (Freed, N., and N. Borenstein, "Multipurpose Internet Mail Extensions (MIME)—Part Two: Media Types", RFC 2046, November 1996 ) and related RFCs. The MIME data consists of a header followed by a body. The header is encoded as a variable-length text string preceded by an 8-bit string length. The body is encoded as a variable-length type-specific octet stream preceded by a 16-bit size in big-endian format.

The basic top-level media types described in RFC 2046 include text, image, audio, video and application. RFC 2425 (Howes, T., M. Smith and F. Dawson, "A MIME Content-Type for Directory Information", RFC 2045, September 1998) and RFC 2426 (Dawson, F., and T. Howes, "vCard MIME Directory Profile", RFC 2046, September 1998) describe a text subtype for directory information suitable, for example, for encoding contact information which might appear on a business card.

Encoding and Printing Considerations

The Print Engine Controller (PEC) (which is the subject of a number of pending U.S. patent applications, including: Ser. Nos. 09/575,108; 10/727,162; 09/575,110; 09/607,985; 6,398,332; 6,394,573; 6,622,923) supports the encoding of two fixed (per-page) $2^4$-ary (15,7) Reed-Solomon codewords and four variable (per-tag) $2^4$-ary (15,7) Reed-Solomon codewords, although other numbers of codewords can be used for different schemes.

Furthermore, PEC supports the rendering of tags via a rectangular unit cell whose layout is constant (per page) but whose variable codeword data may vary from one unit cell to the next. PEC does not allow unit cells to overlap in the direction of page movement.

A unit cell compatible with PEC contains a single tag group consisting of four tags. The tag group contains a single A codeword unique to the tag group but replicated four times within the tag group, and four unique B codewords. These can be encoded using five of PEC's six supported variable codewords. The tag group also contains eight fixed C and D codewords. One of these can be encoded using the remaining one of PEC's variable codewords, two more can be encoded using PEC's two fixed codewords, and the remaining five can be encoded and pre-rendered into the Tag Format Structure (TFS) supplied to PEC.

PEC imposes a limit of 32 unique bit addresses per TFS row. The contents of the unit cell respect this limit. PEC also imposes a limit of 384 on the width of the TFS. The contents of the unit cell respect this limit.

Note that for a reasonable page size, the number of variable coordinate bits in the A codeword is modest, making encoding via a lookup table tractable. Encoding of the B codeword via a lookup table may also be possible. Note that since a Reed-Solomon code is systematic, only the redundancy data needs to appear in the lookup table.

Imaging and Decoding Considerations

The minimum imaging field of view required to guarantee acquisition of an entire tag has a diameter of 39.6 s, i.e.

$$(2 \times (12+2))\sqrt{2} \, s$$

allowing for arbitrary alignment between the surface coding and the field of view. Given a macrodot spacing of 143 μm, this gives a required field of view of 5.7 mm.

Table 4 gives pitch ranges achievable for the present surface coding for different sampling rates, assuming an image sensor size of 128 pixels.

TABLE 4

Pitch ranges achievable for present surface coding for different sampling rates, computed using Optimize Hyperlabel Optics; dot pitch = 1600 dpi, macrodot pitch = 9 dots, viewing distance = 30 mm, nib-to-FOV separation = 1 mm, image sensor size = 128 pixels

| sampling rate | pitch range |
| --- | --- |
| 2 | −40 to +49 |
| 2.5 | −27 to +36 |
| 3 | −10 to +18 |

For the surface coding above, the decoding sequence is as follows:
locate targets of complete tag
infer perspective transform from targets
sample cyclic position code
decode cyclic position code
determine orientation from cyclic position code
sample and decode local Reed-Solomon codeword
determine tag x-y location
infer 3D tag transform from oriented targets
determine nib x-y location from tag x-y location and 3D transform
determine active area status of nib location with reference to active area map
generate local feedback based on nib active area status
determine tag type
sample distributed Reed-Solomon codewords (modulo window alignment, with reference to tag type)
decode distributed Reed-Solomon codewords
verify tag group data CRC
on decode error flag bad region ID sample
determine encoding type, and reject unknown encoding
determine region flags
determine region ID
encode region ID, nib x-y location, nib active area status in digital ink
route digital ink based on region flags Region ID decoding need not occur at the same rate as position decoding and decoding of a codeword can be avoided if the codeword is found to be identical to an already-known good codeword.

If the high-order coordinate width is non-zero, then special care must be taken on boundaries between tags where the low-order x or y coordinate wraps, otherwise codeword errors may be introduced. If wrapping is detected from the low-order x or y coordinate (i.e. it contains all zero bits or all one bits), then the corresponding high-order coordinate can be adjusted before codeword decoding. In the absence of genuine symbol errors in the high-order coordinate, this will prevent the inadvertent introduction of codeword errors.

Alternative Tag Arrangements

It will be appreciated that a range of different tag layouts and tag structures can be utilised.

Figures 16, 17:
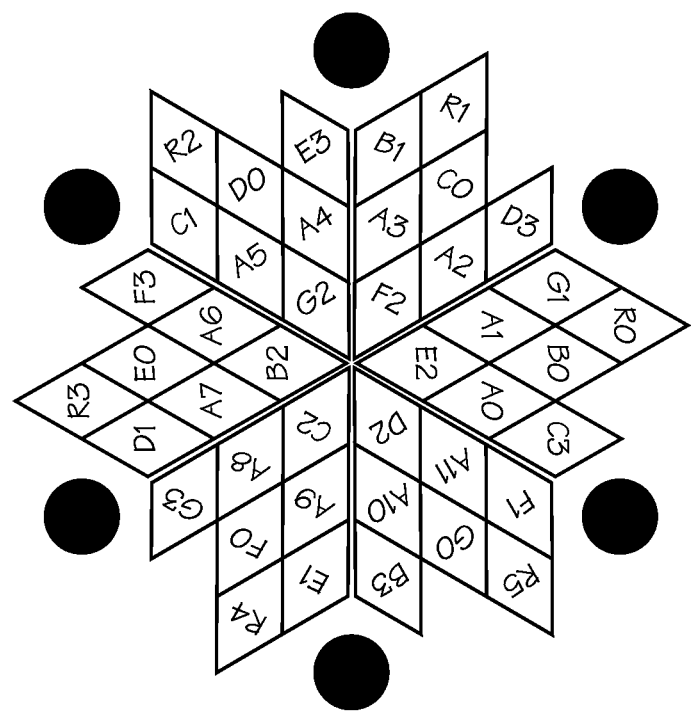
FIG. 16. is an example of an alternative tag group for the tag structure of FIG. 4.
FIG. 17. is a second example of a tag structure.
Figure 18:
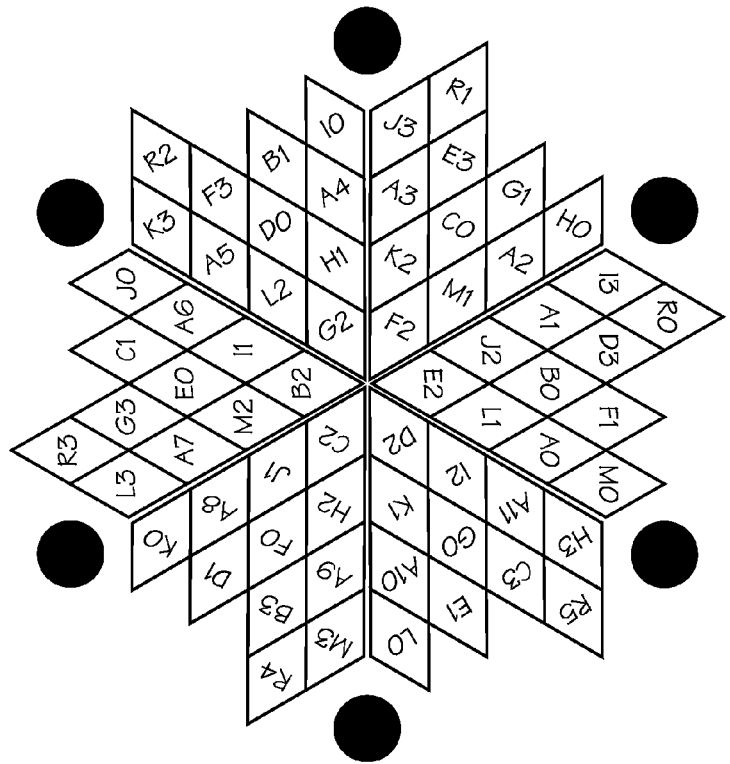
FIG. 18. is a third example of a tag structure.

For example, the tag group shown in FIG. 9 can be replaced with the tag group shown in FIG. 16, in which the tags are not rotated relative to each other. FIG. 17 shows an arrangement that utilises a six-fold rotational symmetry at the physical level, with each diamond shape representing a respective symbol. FIG. 18 shows a version of the tag in which the tag is expanded to increase its data capacity by adding additional bands of symbols about its circumference.

The use of these alternative tag structures, including associated encoding considerations, is described shown in more detail in the copending patent application Ser. Nos. 10/815,609, 10/815,611, 10/815,647 and 10/815,620, the contents of which is incorporated herein by cross reference.

Security Discussion

As described above, authentication relies on verifying the correspondence between data and a signature of that data. The greater the difficulty in forging a signature, the greater the trustworthiness of signature-based authentication.

The item ID is unique and therefore provides a basis for a signature. If online authentication access is assumed, then the signature may simply be a random number associated with the item ID in an authentication database accessible to the trusted online authenticator. The random number may be generated by any suitable method, such as via a deterministic (pseudo-random) algorithm, or via a stochastic physical process. A keyed hash or encrypted hash may be preferable to a random number since it requires no additional space in the authentication database. However, a random signature of the same length as a keyed signature is more secure than the keyed signature since it is not susceptible to key attacks.

Equivalently, a shorter random signature confers the same security as a longer keyed signature.

In the limit case no signature is actually required, since the mere presence of the item ID in the database indicates authenticity. However, the use of a signature limits a forger to forging items he has actually sighted.

To prevent forgery of a signature for an unsighted ID, the signature must be large enough to make exhaustive search via repeated accesses to the online authenticator intractable. If the signature is generated using a key rather than randomly, then its length must also be large enough to prevent the forger from deducing the key from known ID-signature pairs. Signatures of a few hundred bits are considered secure, whether generated using private or secret keys.

While it may be practical to include a reasonably secure random signature in a tag (or local tag group), particularly if the length of the ID is reduced to provide more space for the signature, it may be impractical to include a secure ID-derived signature in a tag. To support a secure ID-derived signature, we can instead distribute fragments of the signature across multiple tags. If each fragment can be verified in isolation against the ID, then the goal of supporting authentication without increasing the sensing device field of view is achieved. The security of the signature can still derive from the full length of the signature rather than from the length of a fragment, since a forger cannot predict which fragment a user will randomly choose to verify. A trusted authenticator can always perform fragment verification since they have access to the key and/or the full stored signature, so fragment verification is always possible when online access to a trusted authenticator is available.

Fragment verification requires that we prevent brute force attacks on individual fragments, otherwise a forger can determine the entire signature by attacking each fragment in turn. A brute force attack can be prevented by throttling the authenticator on a per-ID basis. However, if fragments are short, then extreme throttling is required. As an alternative to throttling the authenticator, the authenticator can instead enforce a limit on the number of verification requests it is willing to respond to for a given fragment number. Even if the limit is made quite small, it is unlikely that a normal user will exhaust it for a given fragment, since there will be many fragments available and the actual fragment chosen by the user can vary. Even a limit of one can be practical. More generally, the limit should be proportional to the size of the fragment, i.e. the smaller the fragment the smaller the limit. Thus the experience of the user would be somewhat invariant of fragment size. Both throttling and enforcing fragment verification limits imply serialisation of requests to the authenticator. Enforcing fragment verification limits further requires the authenticator to maintain a per-fragment count of satisfied verification requests.

A brute force attack can also be prevented by concatenating the fragment with a random signature encoded in the tag. While the random signature can be thought of as protecting the fragment, the fragment can also be thought of as simply increasing the length of the random signature and hence increasing its security.

Fragment verification may be made more secure by requiring the verification of a minimum number of fragments simultaneously.

Fragment verification requires fragment identification. Fragments may be explicitly numbered, or may more economically be identified by the two-dimensional coordinate of their tag, modulo the repetition of the signature across a continuous tiling of tags.

The limited length of the ID itself introduces a further vulnerability. Ideally it should be at least a few hundred bits. In the Netpage surface coding scheme it is 96 bits or less. To overcome this the ID may be padded. For this to be effective the padding must be variable, i.e. it must vary from one ID to the next. Ideally the padding is simply a random number, and must then be stored in the authentication database indexed by ID. If the padding is deterministically generated from the ID then it is worthless.

Offline authentication of secret-key signatures requires the use of a trusted offline authentication device. The QA chip (which is the subject of a number of pending U.S. patent applications, including Ser. Nos. 09/112,763; 09/112,762; 09/112,737; 09/112,761; 09/113,223) provides the basis for such a device, although of limited capacity. The QA chip can be programmed to verify a signature using a secret key securely held in its internal memory. In this scenario, however, it is impractical to support per-ID padding, and it is impractical even to support more than a very few secret keys. Furthermore, a QA chip programmed in this manner is susceptible to a chosen-message attack. These constraints limit the applicability of a QA-chip-based trusted offline authentication device to niche applications.

In general, despite the claimed security of any particular trusted offline authentication device, creators of secure items are likely to be reluctant to entrust their secret signature keys to such devices, and this is again likely to limit the applicability of such devices to niche applications.

By contrast, offline authentication of public-key signatures (i.e. generated using the corresponding private keys) is highly practical. An offline authentication device utilising public keys can trivially hold any number of public keys, and may be designed to retrieve additional public keys on demand, via a transient online connection, when it encounters an ID for which it knows it has no corresponding public signature key. Untrusted offline authentication is likely to be attractive to most creators of secure items, since they are able to retain exclusive control of their private signature keys.

A disadvantage of offline authentication of a public-key signature is that the entire signature must be acquired from the coding, violating our desire to support authentication with a minimal field of view. A corresponding advantage of offline authentication of a public-key signature is that access to the ID padding is no longer required, since decryption of the signature using the public signature key generates both the ID and its padding, and the padding can then be ignored. A forger can not take advantage of the fact that the padding is ignored during offline authentication, since the padding is not ignored during online authentication.

Acquisition of an entire distributed signature is not particularly onerous. Any random or linear swipe of a hand-held sensing device across a coded surface allows it to quickly acquire all of the fragments of the signature. The sensing device can easily be programmed to signal the user when it has acquired a full set of fragments and has completed authentication. A scanning laser can also easily acquire all of the fragments of the signature. Both kinds of devices may be programmed to only perform authentication when the tags indicate the presence of a signature.

Note that a public-key signature may be authenticated online via any of its fragments in the same way as any signature, whether generated randomly or using a secret key. The trusted online authenticator may generate the signature on demand using the private key and ID padding, or may store the signature explicitly in the authentication database. The latter approach obviates the need to store the ID padding.

Note also that signature-based authentication may be used in place of fragment-based authentication even when online access to a trusted authenticator is available.

Table 5 provides a summary of which signature schemes are workable in light of the foregoing discussion.

TABLE 5

Summary of workable signature schemes

| encoding in tags | acquisition from tags | signature generation | online authentication | offline authentication |
|---|---|---|---|---|
| Local | full | random | ok | Impractical to store per ID information |
| | | secret key | Signature too short to be secure | Undesirable to store secret keys |
| | | private key | Signature too short to be secure | |
| Distributed | fragment(s) | random | ok | impractical[b] |
| | | secret key | ok | impractical[c] |
| | | private key | ok | impractical[b] |
| | full | random | ok | impractical[b] |
| | | secret key | ok | impractical[c] |
| | | private key | ok | ok |

Security Specification

Figure 19:
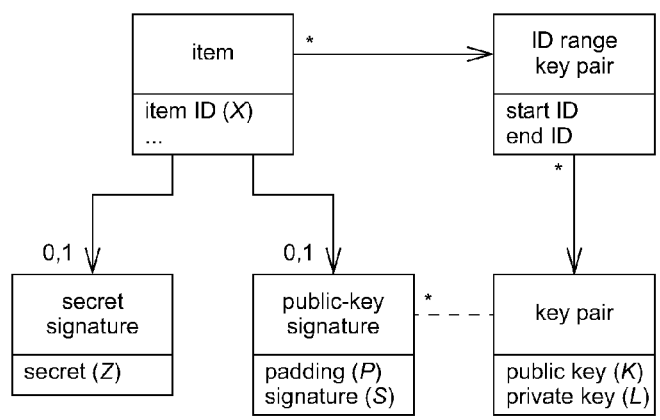
FIG. 19 is an example of an item signature object model.

FIG. 19 shows an example item signature object model.

An item has an ID (X) and other details (not shown). It optionally has a secret signature (Z). It also optionally has a public-key signature. The public-key signature records the signature (S) explicitly, and/or records the padding (P) used in conjunction with the ID to generate the signature. The public-key signature has an associated public-private key pair (K, L). The key pair is associated with a one or more ranges of item IDs.

Typically issuers of security documents and pharmaceuticals will utilise a range of IDs to identify a range of documents or the like. Following this, the issuer will then use these details to generate respective IDs for each item, or document to be marked.

Authentication of the product can then be performed online or offline by sensing the tag data encoded within the tag, and performing the authentication using a number of different mechanisms depending on the situation.

Examples of the processes involved will now be described for public and private key encryption respectively.

Authentication Based on Public-Key Signature
    Setup per ID range:
    generate public-private signature key pair (K, L)
    store key pair (K, L) indexed by ID range
    Setup per ID:
    generate ID padding (P)
    retrieve private signature key (L) by ID (X)
    generate signature (S) by encrypting ID (X) and padding (P) using private key (L):

$$S \leftarrow E_L(X, P)$$

store signature (S) in database indexed by ID (X) (and/or store padding (P))
    encode ID (X) in all tag groups
    encode signature (S) across multiple tags in repeated fashion
    Online fragment-based authentication (user):
    acquire ID (X) from tags
    acquire position $(x, y)_i$ and signature fragment $(T_i)$ from tag
    generate fragment number (i) from position $(x, y)_i$:

$$i \leftarrow F[(x, y)_i]$$

look up trusted authenticator by ID (X)
    transmit ID (X), fragment $(S_i)$ and fragment number (i) to trusted authenticator
    Online fragment-based authentication (trusted authenticator):
    receive ID (X), fragment $(S_i)$ and fragment number (i) from user
    retrieve signature (S) from database by ID (X) (or regenerate signature)
    compare received fragment $(T_i)$ with corresponding fragment of signature $(S_i)$
    report authentication result to user
    Offline signature-based authentication (user):
    acquire ID from tags (X)
    acquire positions $(x, y)_i$ and signature fragments $(T_i)$ from tag
    generate fragment numbers (i) from positions $(x, y)_i$:

$$i \leftarrow F[(x, y)_i]$$

$$S \leftarrow S_0 | S_1 | \ldots | S_{n-1}$$

generate signature (S) from (n) fragments:
    retrieve public signature key (K) by ID (X)
    decrypt signature (S) using public key (K) to obtain ID (X') and padding (P'):

$$X' | P' \leftarrow D_K(S)$$

compare acquired ID (X) with decrypted ID (X')
    report authentication result to user
Authentication Based on Secret-Key Signature
    Setup per ID:
    generate secret (Z)
    store secret (Z) in database indexed by ID (X)
    encode ID (X) and secret (Z) in all tag groups
    Online secret-based authentication (user):
    acquire ID (X) from tags
    acquire secret (Z') from tags
    look up trusted authenticator by ID
    transmit ID (X) and secret (Z') to trusted authenticator
    Online secret-based authentication (trusted authenticator):
    receive ID (X) and secret (Z') from user
    retrieve secret (Z) from database by ID (X)
    compared received secret (Z') with secret (Z)
    report authentication result to user As discussed earlier, secret-based authentication may be used in conjunction with fragment-based authentication.

Cryptographic Algorithms

When the public-key signature is authenticated offline, the user's authentication device typically does not have access to the padding used when the signature was originally generated. The signature verification step must therefore decrypt the signature to allow the authentication device to compare the ID in the signature with the ID acquired from the tags. This precludes the use of algorithms which don't perform the signature verification step by decrypting the signature, such as the standard Digital Signature Algorithm U.S. Department of Commerce/National Institute of Standards and Technology, Digital Signature Standard (DSS), FIPS 186-2, 27 Jan. 2000.

RSA encryption is described in:
    Rivest, R. L., A. Shamir, and L. Adleman, "A Method for Obtaining Digital Signatures and Public-Key Cryptosystems", Communications of the ACM, Vol. 21, No. 2, February 1978, pp. 120-126

Rivest, R. L., A. Shamir, and L. M. Adleman, "Cryptographic communications system and method", U.S. Pat. No. 4,405,829, issued 20 Sep. 1983

RSA Laboratories, PKCS #1 v2.0: RSA Encryption Standard, Oct. 1, 1998

RSA provides a suitable public-key digital signature algorithm that decrypts the signature. RSA provides the basis for the ANSI X9.31 digital signature standard American National Standards Institute, ANSI X9.31-1998, Digital Signatures Using Reversible Public Key Cryptography for the Financial Services Industry (rDSA), Sep. 8, 1998. If no padding is used, then any public-key signature algorithm can be used.

In the hyperlabel surface coding scheme the ID is 96 bits long or less. It is padded to 160 bits prior to being signed.

The padding is ideally generated using a truly random process, such as a quantum process [14,15], or by distilling randomness from random events Schneier, B., Applied Cryptography, Second Edition, John Wiley & Sons 1996.

In the hyperlabel surface coding scheme the random signature, or secret, is 36 bits long or less. It is also ideally generated using a truly random process.

Security Tagging and Tracking

Currency, checks and other monetary documents can be tagged in order to detect currency counterfeiting and counter money laundering activities. The Hyperlabel tagged currency can be validated, and tracked through the monetary system. Hyperlabel tagged products such as pharmaceuticals can be tagged allowing items to be validated and tracked through the distribution and retail system.

A number of examples of the concepts of Hyperlabel security tagging and tracking referring specifically to bank notes and pharmaceuticals, however Hyperlabel tagging can equally be used to securely tag and track other products, for example, traveller's checks, demand deposits, passports, chemicals etc.

Hyperlabel tagging, with the Netpage system, provides a mechanism for securely validating and tracking objects.

Hyperlabel tags on the surface of an object uniquely identify the object. Each Hyperlabel tag contains information including the object's unique ID, and the tag's location on the Hyperlabel tagged surface. A Hyperlabel tag also contains a signature fragment which can be used to authenticate the object. A scanning laser or image sensor can read the tags on any part of the object to identify the object, validate the object, and allow tracking of the object.

Pharmaceutical Tagging

An example of the protection of pharmaceuticals will now be described with reference to the specific protection of currency, such as bank notes, although it will be appreciated that the techniques may be applied to any security document.

Hyperlabel tags can be printed over the entire surface of the pharmaceutical packaging, or only on a smaller area of the packaging. A Hyperlabel pharmaceutical tag contains the item's product ID and a serial number, to uniquely identify an individual item. The product ID identifies the item's National Drug Code (NDC) number. The NDC number is allocated and administered by the FDA (U.S. Food and Drug Administration) for drugs and drug-related items and identifies the product and manufacturer. Alternatively the tag may contain another product ID code, such as the European International Article Numbering (EAN) code, or EPC etc.

Figure 20:
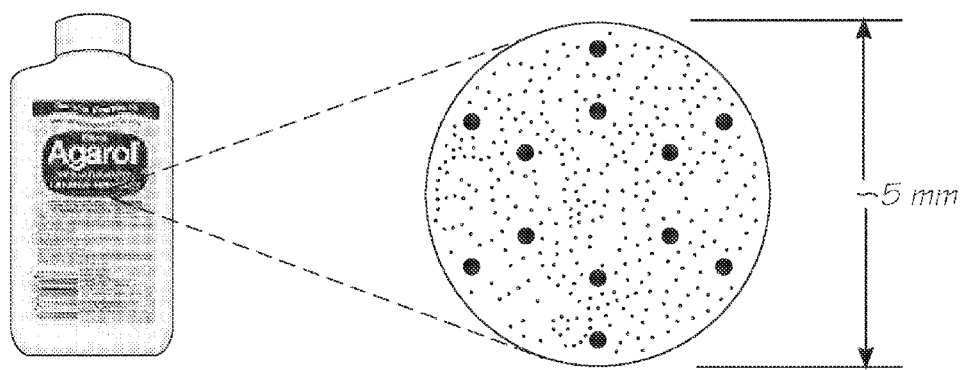
FIG. 20 is an example of Hyperlabel tags applied to a pharmaceutical item.

In this example, each hexagonal Hyperlabel currency tag is around 2.5 mm across, and incorporates a variety of data in the form of printed dots of infrared ink. An example of a tag included on pharmaceutical packaging is shown in FIG. 20.

The tag may also include:

Alignment marks (these are the larger dots in the image above)

A code indicating that the tag is a pharmaceutical tag, as opposed to another commercial Hyperlabel or Hyperlabel tag A horizontal position code, specifying where the tag is along the packaging A vertical position code, specifying where the tag is across the packaging A cryptographic signature Error detection and correction bits Each tag is unique. That is, of all tags ever to be printed on any packaging or other document, no two valid tags will ever be the same. The tags are designed to be easily read with low cost scanners that can be built into a variety of validation devices.

The pharmaceutical ID can be read by a scanner and used to look up details of the item's lot number and expiry date. Alternatively the lot number and expiry date may be contained in the pharmaceutical tag to allow off-line retrieval of this information by any scanner. The pharmaceutical ID may also be used to access details such as dosage and administration information, drug interactions, precautions, contraindications, product warnings, recall information, place of manufacture etc.

Hyperlabel currency tags can be read by any Hyperlabel scanner. These scanners can be incorporated into a variety of devices to facilitate authentication and tracking, as will be described in more detail below.

Tracking

For the purpose of tracking and item validation the manufacturer, or other central authority, maintains a database which tracks the location and status of all items.

Each time a pharmaceutical item is scanned its location is recorded. This location information can be collected in a central database allowing analysis and identification of abnormal product movements and detection of counterfeit pharmaceuticals.

This allows the creation of highly accurate intelligence about criminal activity and the real-time detection of the location of stolen or counterfeit pharmaceuticals at many locations within the supply chain or in distribution. For example, in the case of sophisticated forgeries where Hyperlabel dot patterns are exactly duplicated, there will be multiple copies of exactly forged pharmaceutical items (at a minimum, the original and the forgery). If multiple identical pharmaceutical items appears in different places at the same time, all but one of the pharmaceutical items must be a forgery. All can then be treated as suspect.

Thus, when a transaction is performed involving pharmaceutical items, the general process is as follows:

a transaction is agreed currency is provided relating to the transaction the pharmaceutical item is scanned using an appropriate sensing device the sensing device sense at least one tag and generates predetermined data the predetermined data is transferred to a central government database In this regard, the following predetermined data is automatically sent from the scanners to the central government currency database:

The unique identifier for the pharmaceutical item

The nature of pharmaceutical item validity data

The serial number of the scanner

The time and date of the scan

The physical location of the scanner at the time the scan was taken (for fixed scanners this is automatic, and for mobile scanners the physical location is determined using a GPS tracker)

The network location of the scanner

The identity of the person making reportable transactions

Thus, Hyperlabel technology makes it possible to build databases containing the history of all pharmaceutical items produced, and it allows them to be tracked through to distribution and use by the consumer. The data collected can be used to build up flow maps based on the validation data received, and its presence will provide a powerful tool for law enforcement agencies to combat pharmaceutical item counterfeiting.

There are also a large number of transactions involved - several hundred million per day. These are within the capability of conventional distributed transaction processing systems. However, the Hyperlabel currency system can be implemented at substantially lower cost by using new generation database systems that perform transactions in semiconductor memory, instead of disk drives. These transactions can then be continually streamed to disk as a background 'backup' task. Such systems are likely to be sufficiently mature by the time that a Hyperlabel based currency tracking system comes on-line that they will be a viable choice.

As well as basic tracking and validation functions, the database system may have the following additional features:

Indication of abnormal pharmaceutical item movement patterns within the system

The provision of pharmaceutical item demand forecasts

Data mining features that could be used to detect and prosecute counterfeiters

Neural network based fraud detection

Geographic trends identification

A central database maintains up-to-date information on valid object IDs, an object ID hotlist (for all suspect object IDs), and a list of public keys corresponding to object IDs. The central server also maintains an object scanning history to track an object's movements. Each time an object is scanned, its timestamped location is recorded. If known, the details of the object owner may also be recorded. This information may be known particularly in the case of large transactions. This object scanning history data can be used to detect illegal product movements, for example, the illegal import of a pharmaceutical. It can also be used to detect abnormal or suspicious product movements which may be indicative of product counterfeiting.

If an object is known to be stolen it can be immediately added to an object ID hotlist on the central server. This hotlist is automatically distributed to (or becomes accessible to) all on-line scanners, and will be downloaded to all off-line scanners on their next update. In this way the stolen status is automatically and rapidly disseminated to a huge number of outlets. Similarly, if an object is in any other way suspect it can be added to the hotlist so that its status is flagged to the person scanning the object.

An on-line scanner has instant access to the central server to allow checking of each object ID at the time of scanning. The object scanning history is also updated at the central server at the time the object is scanned.

An off-line scanner stores object status data internally to allow validation of a scanned object. The object status data includes valid ID range lists, an object ID hotlist, a public key list, and an object scanning history. Each time an object is scanned the details are recorded in the object scanning history. The object status data is downloaded from the central server, and the object scanning history is uploaded to the central server, each time the scanner connects.

A mobile scanner's location can be provided to the application by the scanner, if it is GPS-equipped. Alternatively the scanner's location can be provided by the network through which it communicates.

For example, if the hand-held scanner uses the mobile phone network, the scanner's location can be provided by the mobile phone network provider. There are a number of location technologies available. One is Assisted Global Positioning System (A-GPS). This requires a GPS-equipped handset, which receives positioning signals from GPS satellites. The phone network knows the approximate location of the handset (in this case the handset is also the scanner) from the nearest cell site. Based on this, the network tells the handset which GPS satellites to use in its position calculations. Another technology, which does not require the device to be GPS-equipped, is Uplink Time Difference of Arrival (U-TDOA). This determines the location of a wireless handset, using a form of triangulation, by comparing the time it takes a wireless handset's signal to reach several Location Measurement Units (LMUs) installed at the network's cell sites. The handset location is then calculated based on the differences in arrival times of the three (or more) signals.

Authentication

Each object ID has a signature. Limited space within the Hyperlabel tag structure makes it impractical to include a full cryptographic signature in a tag so signature fragments are distributed across multiple tags. A smaller random signature, or secret, can be included in a tag.

To avoid any vulnerability due to the limited length of the object ID, the object ID is padded, ideally with a random number. The padding is stored in an authentication database indexed by object ID. The authentication database may be managed by the manufacturer, or it may be managed by a third-party trusted authenticator.

Each Hyperlabel tag contains a signature fragment and each fragment (or a subset of fragments) can be verified, in isolation, against the object ID. The security of the signature still derives from the full length of the signature rather than from the length of the fragment, since a forger cannot predict which fragment a user will randomly choose to verify.

Fragment verification requires fragment identification. Fragments may be explicitly numbered, or may by identified by the two-dimensional coordinate of their tag, modulo the repetition of the signature across continuous tiling of tags.

Note that a trusted authenticator can always perform fragment verification, so fragment verification is always possible when on-line access to a trusted authenticator is available.

Establishing Authentication Database

Prior to allocating a new range of IDs, some setup tasks are required to establish the authentication database.

For each range of IDs a public-private signature key pair is generated and the key pair is stored in the authentication database, indexed by ID range.

For each object ID in the range the following setup is required:

generate ID padding and store in authentication database, indexed by object ID retrieve private signature key by object ID generate signature by encrypting object ID and padding, using private key store signature in authentication database indexed by object ID, and/or store the padding, since the signature can be re-generated using the ID, padding and private key encode the signature across multiple tags in repeated fashion This data is required for the Hyperlabel tags therefore the authentication database must be established prior to, or at the time of, printing of the Hyperlabels.

Security issues are discussed in more detail above.

Figure 21:
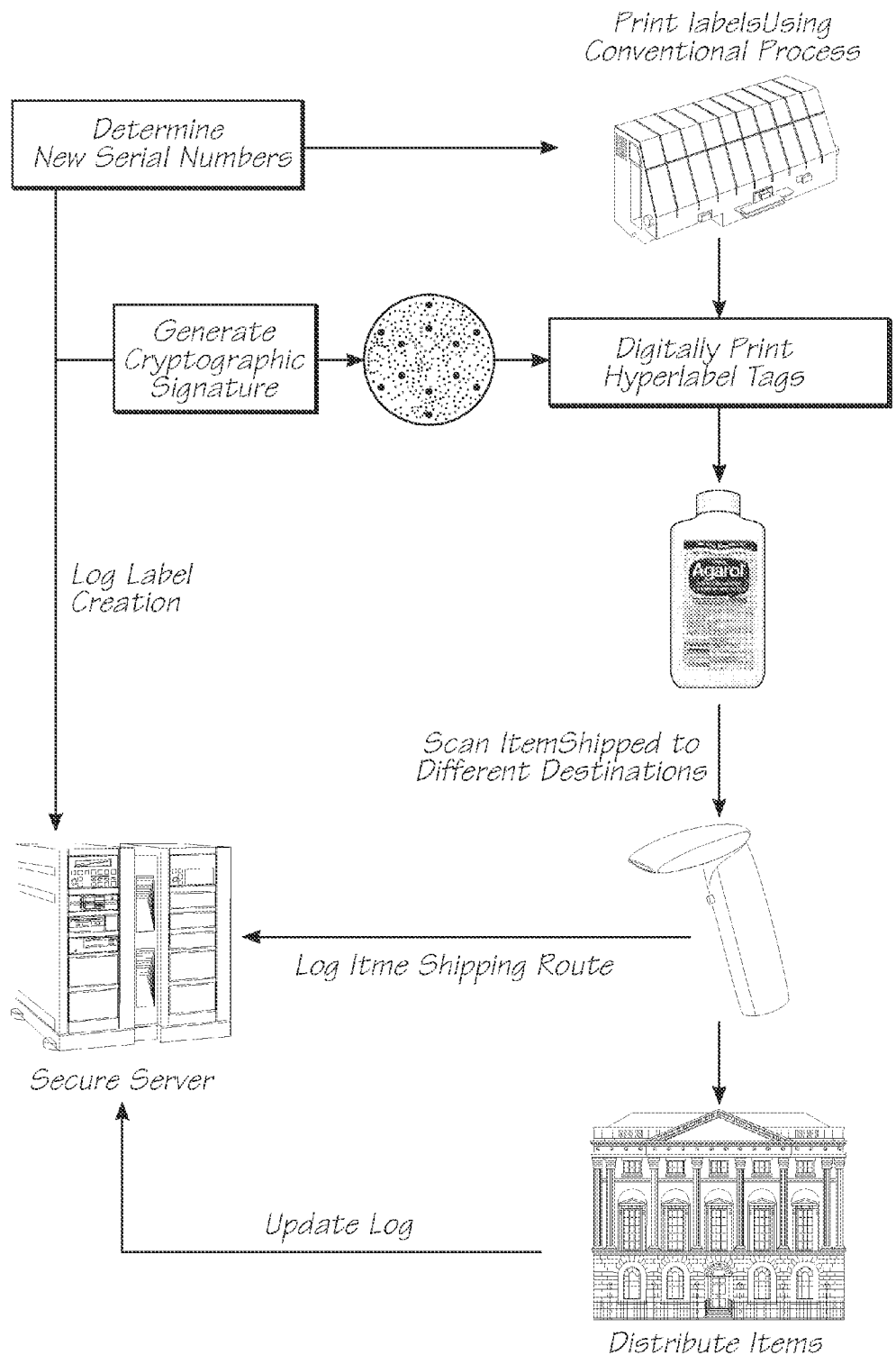
FIG. 21 is an example of a pharmaceutical distribution process.

FIG. 21 summarises printing and distribution of pharmaceutical packaging with Hyperlabel tags. Pharmaceuticals are also logged in the database whenever they are scanned in circulation, and also when they are destroyed.

While the technology to print commercial Hyperlabel tags will be commercially available, only the authorized manufacturers will be able to print the codes corresponding to their products. These codes can be protected by 2048 bit RSA cryptography embedded within the integrated circuits (chips) embedded in the Memjet™ printers used to print Hyperlabel tags. This is a highly secure form of asymmetric cryptography, using private and public keys. The private keys relating to any particular currency would be kept only by authorised national security agencies.

Off-Line Public-Key-Based Authentication

An off-line authentication device utilises public-key signatures. The authentication device holds a number of public keys. The device may, optionally, retrieve additional public keys on demand, via a transient on-line connection when it encounters an object ID for which it has no corresponding public key signature.

For off-line authentication, the entire signature is needed. The authentication device is swiped over the Hyperlabel tagged surface and a number of tags are read. From this, the object ID is acquired, as well as a number of signature fragments and their positions. The signature is then generated from these signature fragments. The public key is looked up, from the scanning device using the object ID. The signature is then decrypted using the public key, to give an object ID and padding. If the object ID obtained from the signature matches the object ID in the Hyperlabel tag then the object is considered authentic.

The off-line authentication method can also be used on-line, with the trusted authenticator playing the role of authenticator.

On-Line Public-Key-Based Authentication

An on-line authentication device uses a trusted authenticator to verify the authenticity of an object. For on-line authentication a single tag can be all that is required to perform authentication. The authentication device scans the object and acquires one or more tags. From this, the object ID is acquired, as well as at least one signature fragment and its position. The fragment number is generated from the fragment position. The appropriate trusted authenticator is looked up by the object ID. The object ID, signature fragment, and fragment number are sent to the trusted authenticator.

The trusted authenticator receives the data and retrieves the signature from the authentication database by object ID. This signature is compared with the supplied fragment, and the authentication result is reported to the user.

On-Line Secret-Based Authentication

Alternatively or additionally, if a random signature or secret is included in each tag (or tag group), then this can be verified with reference to a copy of the secret accessible to a trusted authenticator. Database setup then includes allocating a secret for each object, and storing it in the authentication database, indexed by object ID.

The authentication device scans the object and acquires one or more tags. From this, the object ID is acquired, as well as the secret. The appropriate trusted authenticator is looked up by the object ID. The object ID and secret are sent to the trusted authenticator.

The trusted authenticator receives the data and retrieves the secret from the authentication database by object ID. This secret is compared with the supplied secret, and the authentication result is reported to the user.

Secret-based authentication can be used in conjunction with on-line fragment-based authentication is discussed in more detail above.

Product Scanning Interactions

Figure 22:
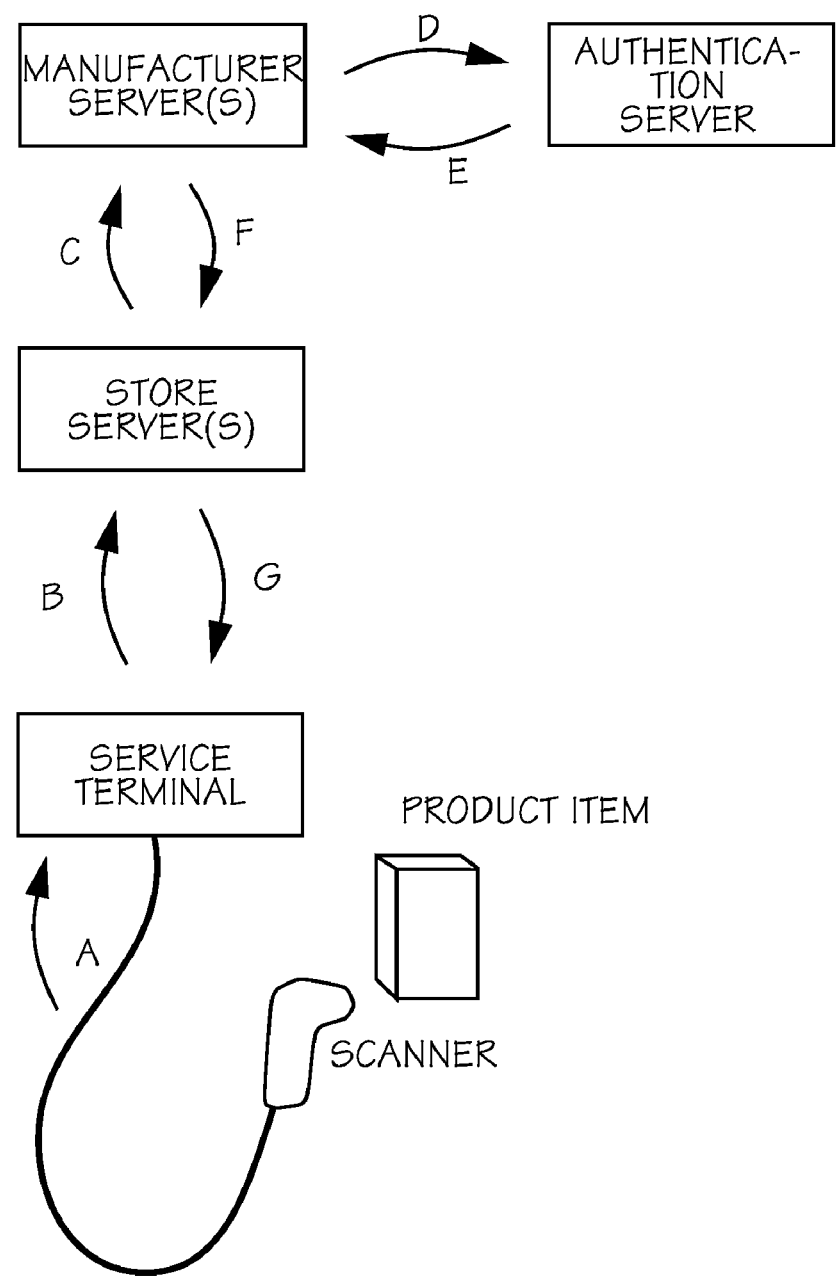
FIG. 22. is an example of Scanning at Retailer interactions.

Product Scanning at a retailer is illustrated in FIG. 22. When a store operator scans a Hyperlabel tagged product the tag data is sent to the service terminal (A). The service terminal sends the transaction data to the store server (B). The store server sends this data, along with the retailer details, to the manufacturer server (C). The Hyperlabel server knows which manufacturer server to send the message to from the object ID. On receipt of the input, the manufacturer server authenticates the object, if the manufacturer is the trusted authenticator. Alternatively the manufacturer server passes the data on to the authentication server to verify the object ID and signature (D). The authentication server sends the authentication result back to the manufacturer server (E). The manufacturer server checks the status of the object ID (against its valid ID lists and hotlist), and sends the response to the store server (F), which in turn send the result back the store service terminal (G). The store server could also communicate with the relevant authentication server directly.

Figure 23:
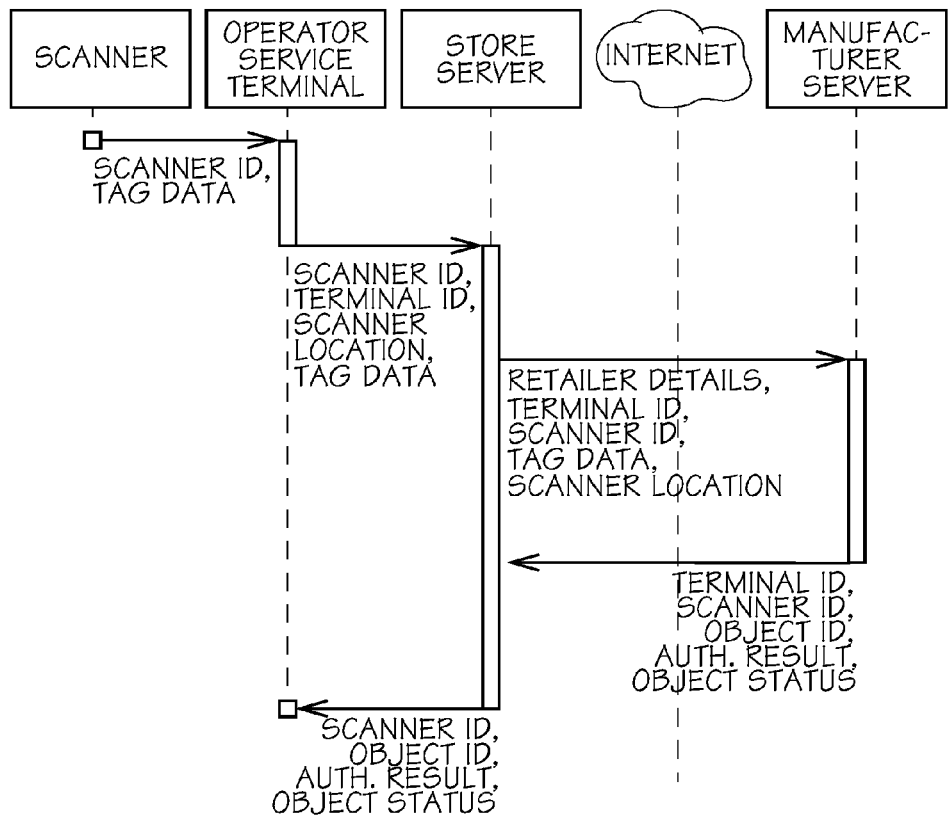
FIG. 23. is an example of Online Scanning interaction detail.

The interaction detail for on-line product scanning at a retailer is shown in FIG. 23. The store operator scans the Hyperlabel tagged product. The scanner sends the scanner ID and tag data to the service terminal. The service terminal sends this data along with the terminal ID and scanner location to the store server. The store server then sends the request on to the manufacturer server, which performs authentication (either itself or via a third party authentication server) and determines the object status. The response is then sent back to the store server, and on to the operator service terminal.

Figure 24:
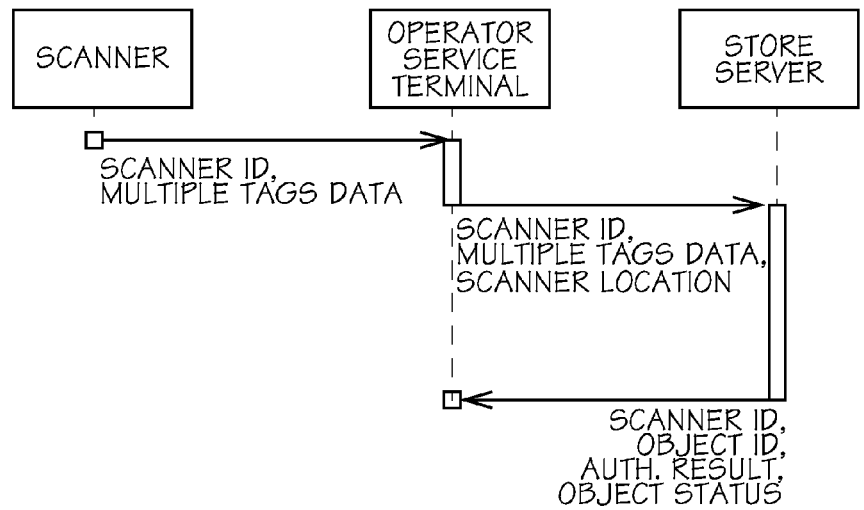
FIG. 24. is an example of Offline Scanning interaction details.

The interaction detail for off-line product scanning at a retailer is shown in FIG. 24. The store operator scans the Hyperlabel tagged product. The scanner sends the scanner ID and tag data from multiple tags to the service terminal. The service terminal sends this data, along with the terminal ID and scanner location, to the store server. The store server then performs off-line authentication, as described in Section 3.4.2, and determines the object status through its cached hotlist, valid object ID lists, and public key list. The store server records the scan details in its internal object scanning history. The response is then sent back to the operator service terminal.

An alternative for off-line product scanner occurs where the scanner is a hand-held, stand-alone scanner. In this case the cached authentication data is stored within the scanner itself, and the scanner performs the validation internally. The object scanning history is also cached within the scanner. Periodically the scanner connects to the central database, uploads it's object scanning history, and downloads the latest public key list, object ID hotlist and valid ID range list. This connection may be automatic (and invisible to the user), or may be initiated by the user, for example, when the scanner is placed in a docking station/charger.

Figure 25:
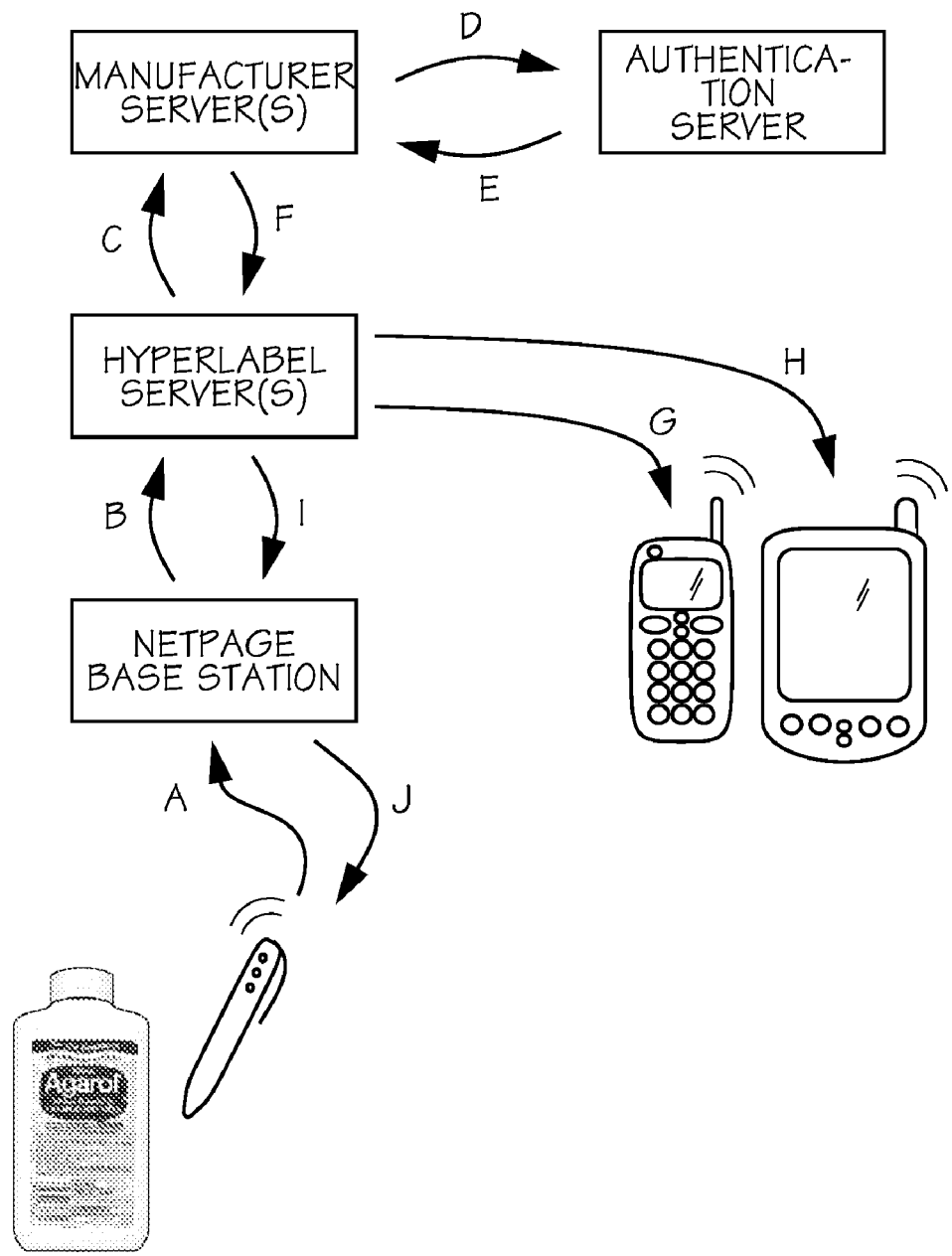
FIG. 25. is an example of netpage Pen Scanning interactions.

Product scanning with a Netpage pen is illustrated in FIG. 25. When a user scans a Hyperlabel tagged item with their Netpage pen, the input is sent to the Netpage System, from the user's Netpage pen, in the usual way (A). To scan a product rather than interact with it, the pen can be placed in a special mode. This is typically a one-shot mode, and can be initiated by tapping on a <scan> button printed on a Netpage. Alternatively, the pen can have a user-operable button, which, when held down during a tap or swipe, tells the pen to treat the interaction as a product scan rather than a normal interaction. The tag data is transmitted from the pen to the user's Netpage base station. The Netpage base station may be the user's mobile phone or PDA, or it may be some other Netpage device, such as a PC. The input is relayed to the Hyperlabel server (B) and then on to manufacturer server (C) in the usual way. On receipt of the input, the manufacturer server authenticates the object if the manufacturer is the trusted authenticator. Alternatively the manufacturer server passes the data on to the authentication server to verify the object ID and signature (D). The authentication server sends the authentication result back to the manufacturer server (E). The manufacturer server checks the status of the object ID (against its valid ID lists and hotlist), and sends the response to the Hyperlabel server (G). The Hyperlabel server, as part of the Netpage system, can know the identity and devices of the user. The Hyperlabel server will relay the manufacturer server's response to the user's phone (G) or Web browsing device (H) as appropriate. If the user's Netpage pen has LEDs then the Hyperlabel server can send a command to the user's pen to light the appropriate LED(s) (I,J).

Figure 26:
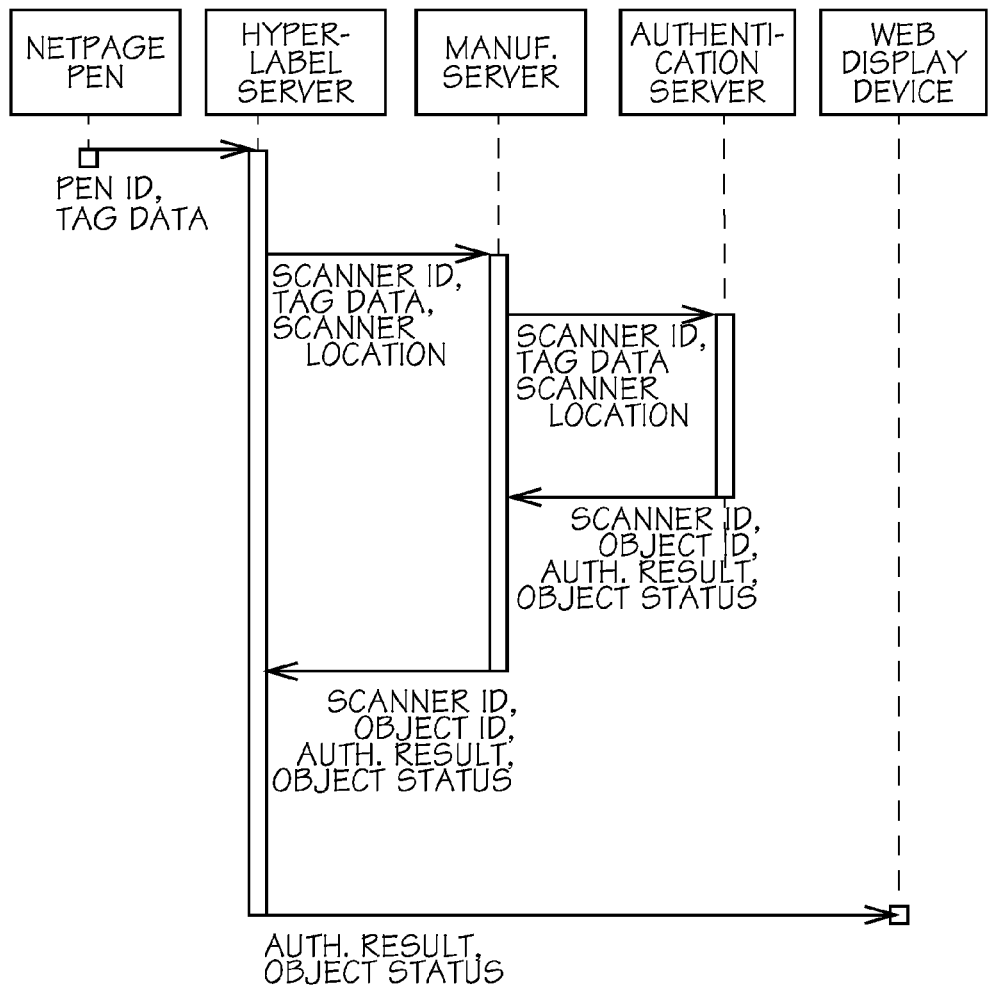
FIG. 26. is an example of netpage Pen Scanning interaction details.

The interaction detail for scanning with a Netpage pen is shown in FIG. 26. The Netpage pen clicks on the Hyperlabel tagged product. The Netpage pen sends the pen id, the product's tag data and the pen's location to the Hyperlabel server. If the pen ID is not already associated with a scanner, the Hyperlabel server may create a new scanner record for the pen, or may use the pen ID as a scanner ID. The Hyperlabel server sends the scanner ID, tag data, and scanner location (if known) to the manufacturer server, which performs authentication (either itself or via a third party authentication server) and determines the object status. The response is then sent back to the Hyperlabel server, and on to the user's default Web browsing device.

Security Tagging and Tracking Object Modes

Figure 37:
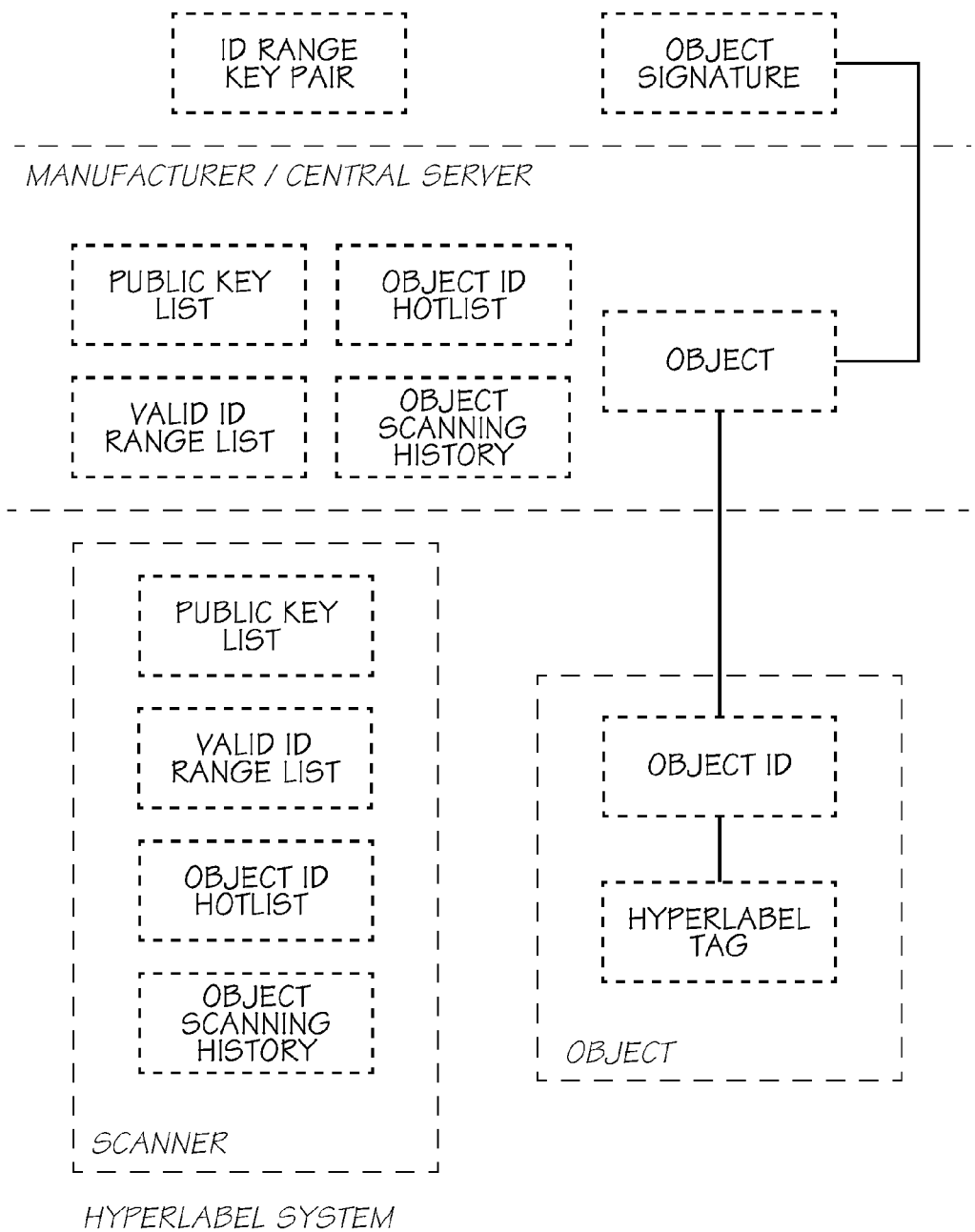
FIG. 37. is an example of Tagging and Tracking Object Management.

The Security Tagging and Tracking object model revolves around Hyperlabel tags, object IDs, and signatures. FIG. 37 illustrates the management and organisation of these objects.

Figure 27:
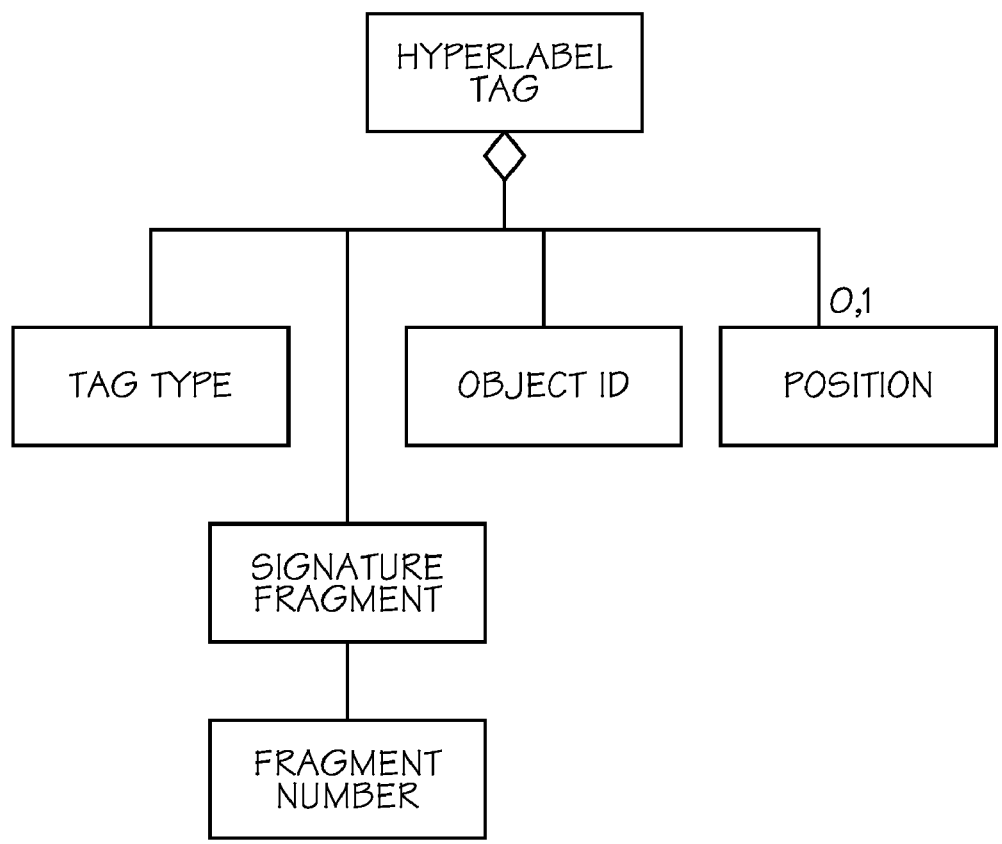
FIG. 27. is an example of a Hyperlabel tag class diagram.

As shown in FIG. 27, a Hyperlabel tag comprises a tag type, object ID, two-dimensional position and a signature fragment. The tag type indicates whether this is a tag on a common object, or whether the tag is on a special type of object such as a currency note or a pharmaceutical product. A signature fragment has an optional fragment number which identifies the fragment's place within the full signature.

Figure 28:
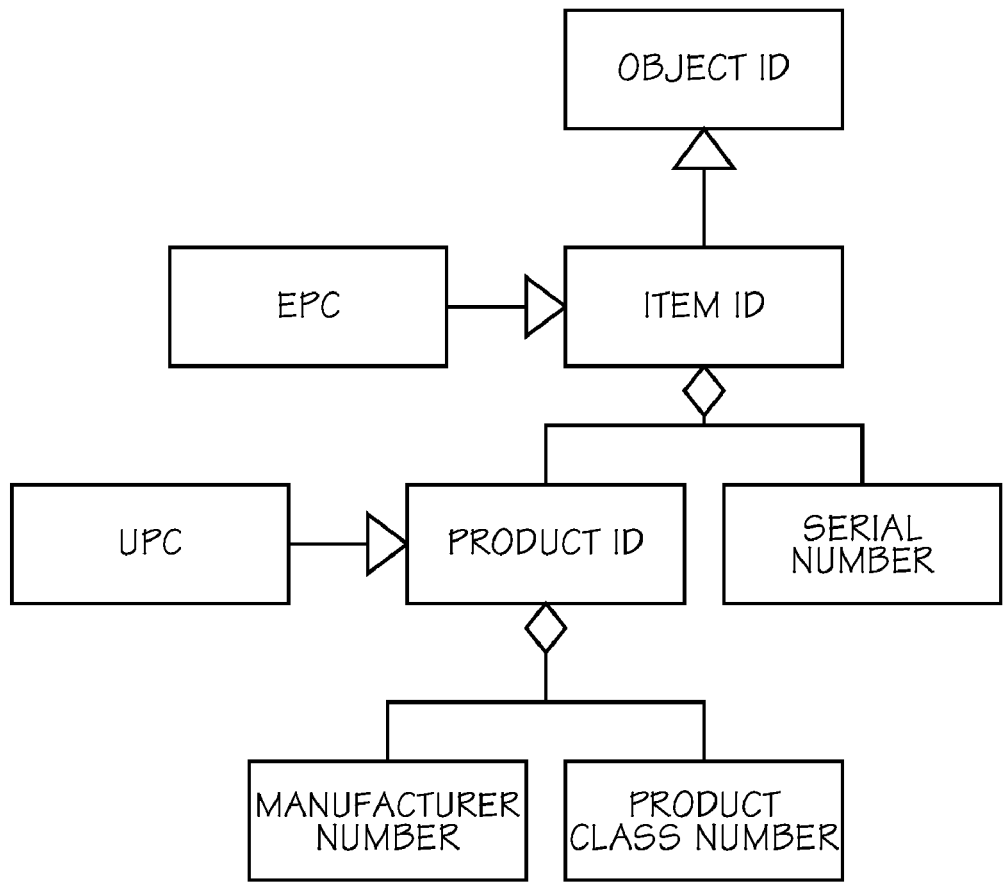
FIG. 28. is an example of a item ID class diagram

As described above, a product's unique item ID may be seen as a special kind of unique object ID. The Electronic Product Code (EPC) is one emerging standard for an item ID. An item ID typically consists of a product ID and a serial number. The product ID identifies a class of product, while the serial number identifies a particular instance of that class, i.e. an individual product item. The product ID in turn typically consists of a manufacturer number and a product class number. The best-known product ID is the EAN.UCC Universal Product Code (UPC) and its variants. The Item ID class diagram is shown in FIG. 28.

Figure 29:
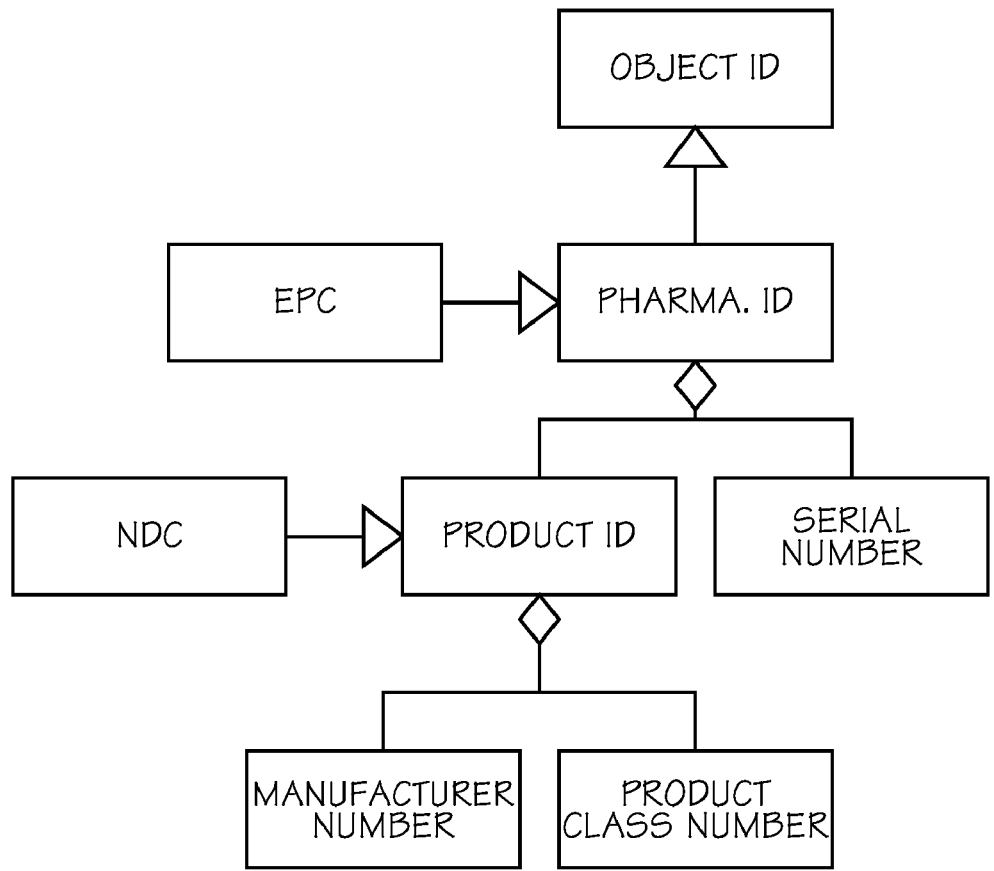
FIG. 29. is an example of a pharmaceutical ID class diagram

Pharmaceuticals are identified by a pharmaceutical ID. Typically the pharmaceutical ID will be an EPC. A pharmaceutical ID consists of a product ID and a serial number. The product ID in turn typically consists of a manufacturer number and a product class number. The best known product ID for pharmaceutical products is the National Drug Code (NDC), allocated and administered by the US Food and Drug Administration. The Pharmaceutical ID class diagram is shown in FIG. 29.

Figure 30:
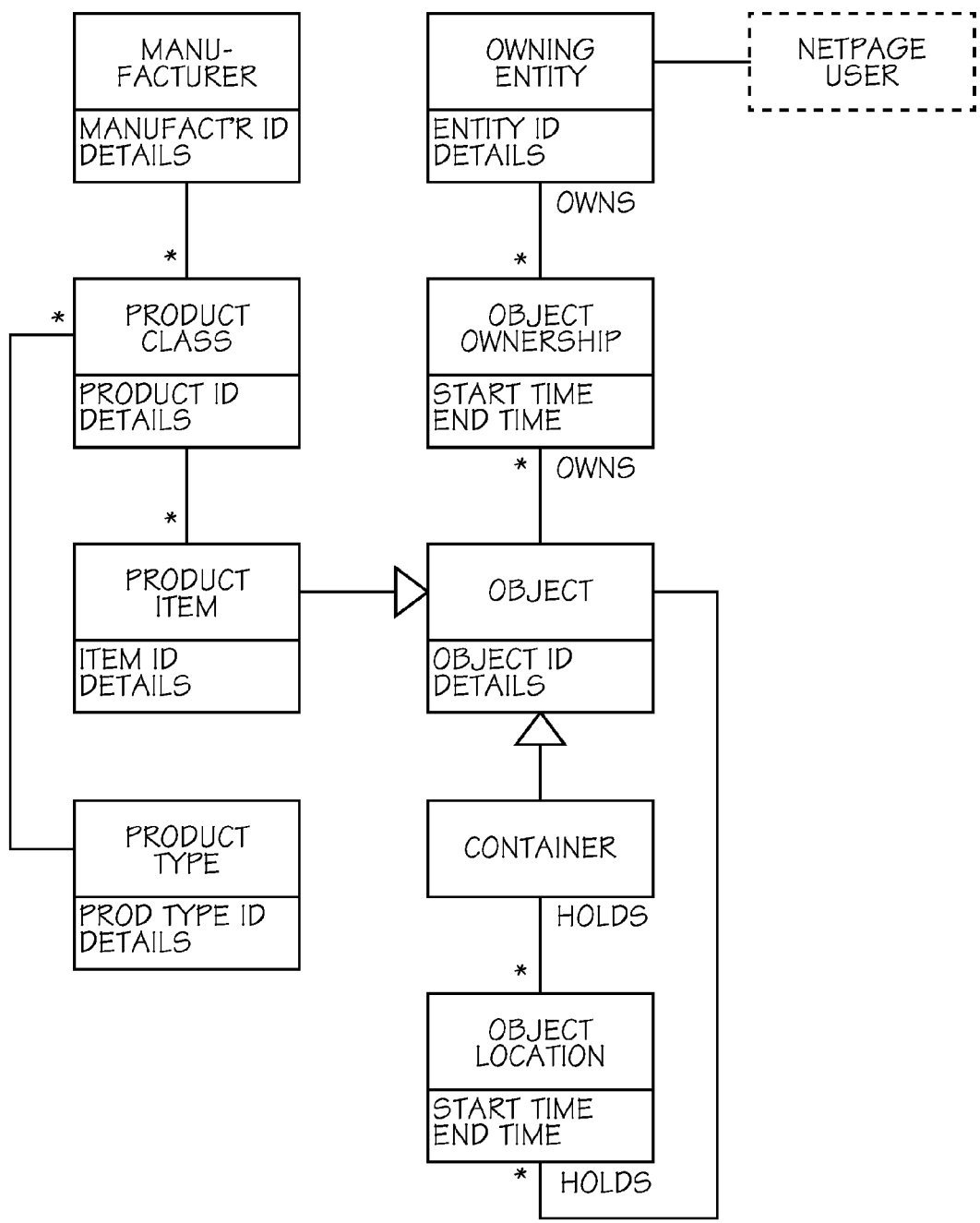
FIG. 30. is an example of an Object Description, ownership and aggregation class diagram.

Object Description, ownership and aggregation class diagram is shown in FIG. 30. This is described in more detail above.

Figure 31:
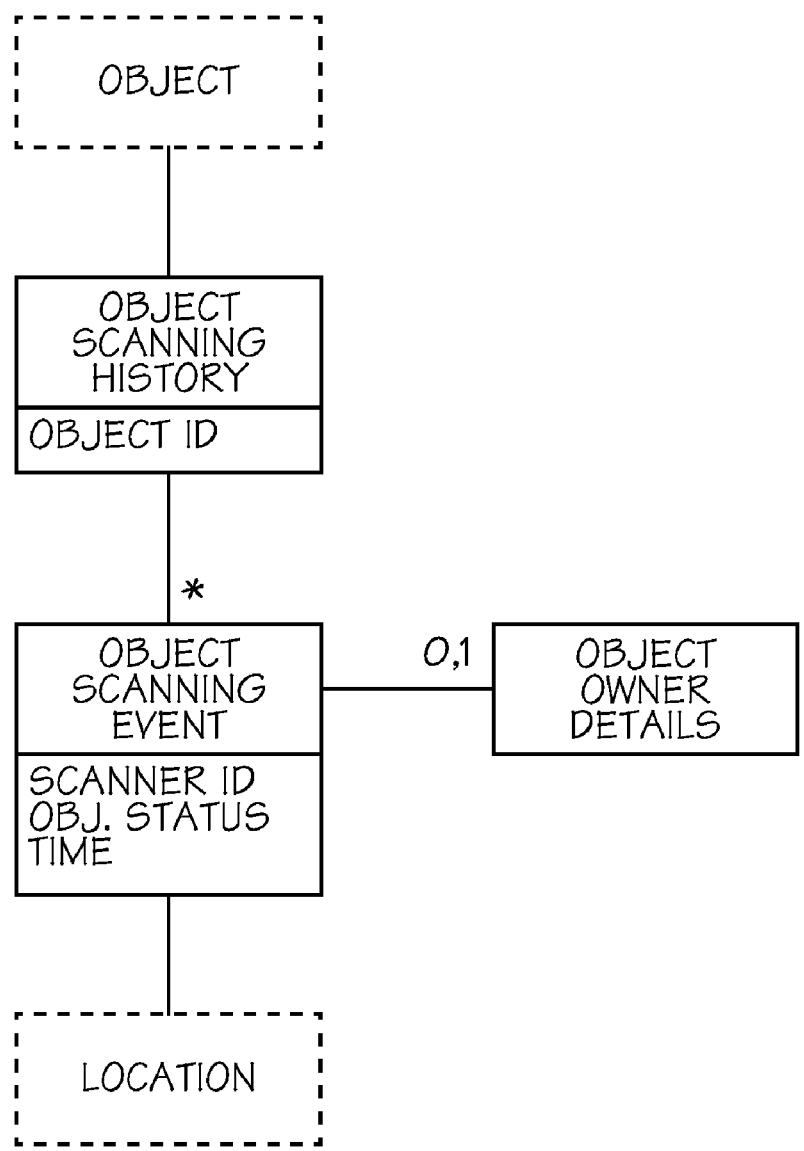
FIG. 31. is an example of an Object Scanning History class diagram.

The Object Scanning History class diagram is shown in FIG. 31. An object has an object scanning history, recording each time the scanner scans an object. Each object scanned event comprises the scanner ID, the date and time of the scan, and the object status at the time of the scan, and the location of the scanner at the time the object was scanned. The object status may be valid, stolen, counterfeit suspected, etc. If known, the object owner details may also be recorded.

Figure 32:
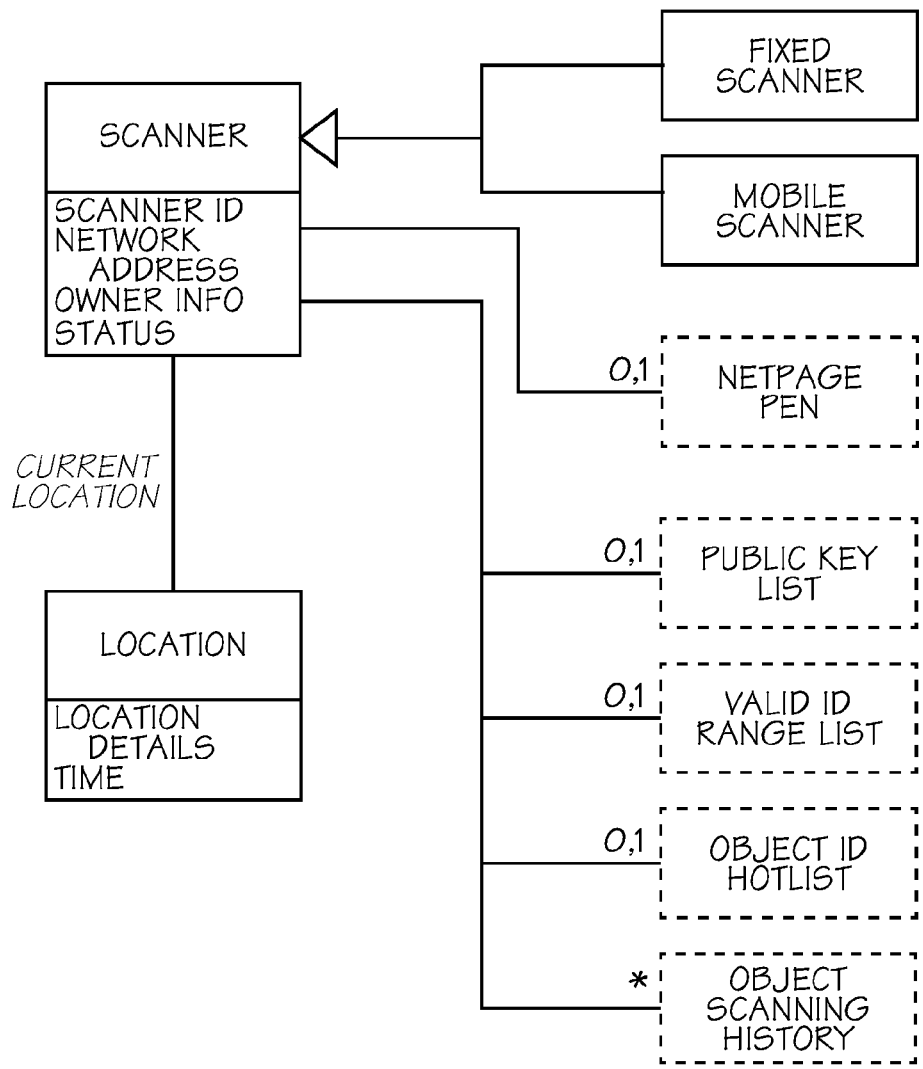
FIG. 32. is an example of scanner class diagram.

A scanner has a unique scanner ID, a network address, owner information and a status (e.g. on-line, off-line). A scanner is either a mobile scanner, whose location may vary, or a fixed scanner, whose location is known and constant. A scanner has a current location, comprising the location details and a timestamp. A scanner may be a Netpage pen, in which case it will be associated with a Netpage Pen record. If a scanner in off-line, it will keep an object scanning history, and will optionally store a public key list, a valid ID range list and an object ID hotlist. The scanner class diagram is shown in FIG. 32.

Figure 33:
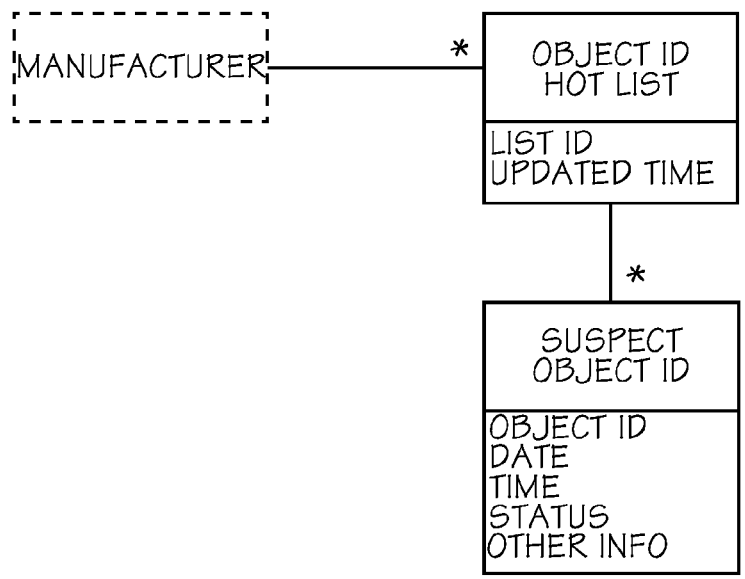
FIG. 33. is an example of an object ID hot list diagram.

The manufacturer, or other central authority, maintains a number of Object ID Hot Lists, each with a unique list ID, and the time the list was last updated. Each hot list comprises a list of suspect object IDs, comprising the object ID, date, time, status (suspected counterfeit, stolen, etc.) and other information. The Object ID Hot List class diagram is shown in FIG. 33.

Figure 34:
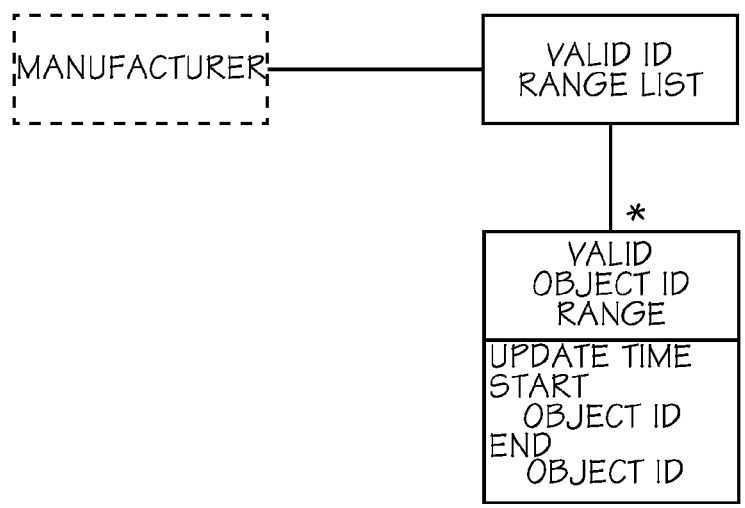
FIG. 34. is an example of a valid ID range class diagram.

The manufacturer, or other central authority, maintains a list of valid ID ranges. Each valid object ID range entry in the list comprises the start object ID and end object ID (the valid ID range) and the time the entry was updated. The Valid ID Range List class diagram is shown in FIG. 34.

Figure 35:
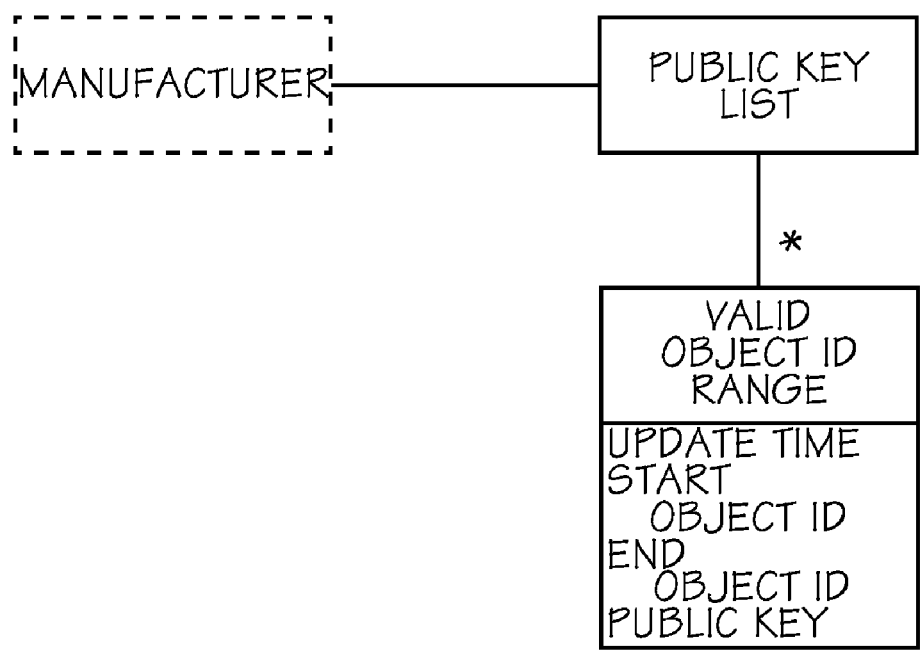
FIG. 35. is an example of Public Key List class diagram.

The manufacturer, or other central authority, maintains a public key list. The public key list consists of a number of entries identifying the public key for a range of Object IDs. Each valid object ID range entry comprises the update time for the entry, the start object ID for the range, the end object ID for the range, and the public key applicable to each object ID in the given range. The Public Key List class diagram is shown in FIG. 35.

Figure 36:
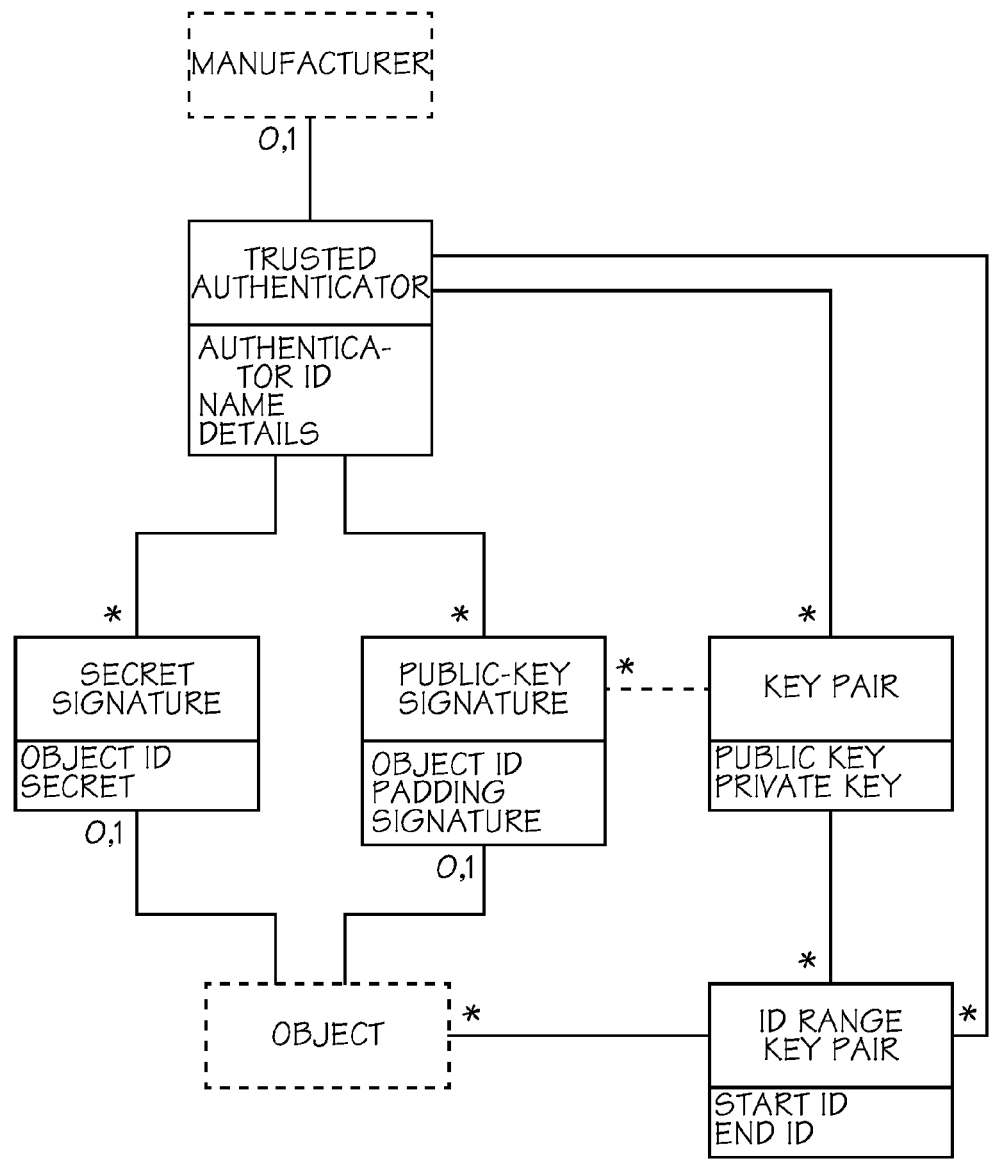
FIG. 36. is an example of a Trusted Authenticator class diagram.

Object authentication may be performed by the manufacturer, or by a third-party trusted authenticator. A trusted authenticator has an authenticator ID, name and details. A trusted authenticator holds a list of public-private key pairs, each associated with one or more ID ranges. This is a list of object ID ranges (identified by the start and end ID) and the corresponding public/private signature key pair. A trusted authenticator also holds a list of secret signatures, and a list of public-key signatures. Each public-key signature identifies the actual signature and/or the padding used to generate the signature. Each secret signature and public-key signature is associated by object ID with a unique object. The Trusted Authenticator class diagram is shown in FIG. 36.

Scanners

Hyperlabel scanners can be built into a variety of devices. Scanners may be fixed or mobile. A fixed scanner has a permanent, known location. A mobile scanner has no fixed location. A scanner may be on-line, i.e. have immediate access to the central database, or it may be off-line.

Scanners may be specific to a particular product application, such as a currency counter, or may be a generic Hyperlabel scanner. Hyperlabel scanners may be embedded in other multi-function devices, for example, a mobile phone or PDA.

Hyperlabel currency tags can be read using many types of scanner, including:
- Cash registers
- POS checkouts
- Mobile phone with inbuilt scanner
- Hyperlabel pens
- Vending machines The Hyperlabel technology used in these devices can be implemented in a wide range of applications. As a result, the development and deployment costs can be shared by the key stakeholders. It will be realised that these can therefore be implemented in a manner similar to that described above with respect to security documents.

Hyperlabel scanners built into a variety of products will include the following features, currently under development at Silverbrook Research.
- An infrared image sensor to read the Hyperlabel tags that uniquely identify each pharmaceutical item.
- A 32 bit RISC processor with 20 megabits of secure code space signed using 2048 bit RSA cryptography.
- A highly secure processor with cryptographic and physical security features for verifying the cryptographic signature on Hyperlabel tags (under development at Silverbrook Research).
- Infrared optics, including filters tuned to the Hyperlabel ink infrared spectrum.
- A real-time clock to verify the time of each transaction reported.
- Software to decode the Hyperlabel tags, record the details of each scan, to validate each note scanned, and to facilitate automatic and secure communications with an online database.
- Communications systems to create secure network connections to the central currency verification database.

Various of the Hyperlabel scanners described below are also planned to include the following units:
- An inbuilt display and data entry mechanism to indicate to the operator details of the pharmaceutical item being dispensed, items that are suspected of being counterfeit, and the identity of the person requesting reportable cash transactions.
- A cache of the serial numbers of all known counterfeit pharmaceutical item.
- Other spectral filters tuned to the secure currency ink spectrum (which differs from the commercially available Hyperlabel ink).
- A GPS tracker to verify the location of the currency counter at the time of use.

Mobile Phone with Inbuilt Scanner

A mobile phone with an inbuilt Hyperlabel infrared scanner to scan and validate each item can be used in a range of locations such as where medications are stored for distribution, or dispensed. It is intended for wide use and distribution among the hundreds of millions of mobile phone subscribers. It can be used by consumers to validate items, or to quickly find out additional information about a prescription item. It can also be used for inventory management and validity checking applications, such as for policing trademark infringement, and stocktaking.

Hyperlabel Supermarket Checkout Scanner

One of the other major applications of Hyperlabel is in consumer packaged goods, where it has the potential of being the next generation bar code and allowing automatic tracking of individual items. The application of Hyperlabel laser scanners makes it possible to automatically scan products at supermarket checkouts. These checkouts will be able to read pharmaceutical Hyperlabels to validate each item at the point of sale An example of a hyperlabel is shown in FIG. 38.

Cash Registers

Cash registers can have an add-on or built-in currency scanner for a small additional cost per unit. The pharmaceutical item is scanned as it is processed for sale. An example of a cash register is shown in FIG. 39.

Hyperlabel Pen

A Hyperlabel Pen can be used as a miniature low cost image sensor for consumer and small business use. It uses an infrared image sensor, and to image a Hyperlabel tag whenever it is clicked against a surface. These pens are also intended for high volume consumer use, with intended distribution exceeding 100 million units. While its primary application is a wide range of 'interactive paper' and computer peripheral uses, it also allows consumers to validate pharmaceuticals and other goods by clicking on the Hyperlabel.

When read by a Hyperlabel Pen, the Hyperlabel allows the pen to track its own nib movement relative to the label. The pen uses the position and orientation of each tag in its 5 mm field of view to determine a much more precise position than just the position encoded in a tag. The pen transmits its interaction data to a Hyperlabel Server for interpretation. The interaction data consists of movement data (or 'digital ink'), defined relative to the product label identified by its EPC, thus enabling consumers to use a product label to interact directly with the manufacturer's Web site. The Hyperlabel network will be managed by dedicated Hyperlabel servers, and any pharmaceutical scans from Hyperlabel Pens will be routed through these servers to the Pharmaceutical server.

Figure 2:
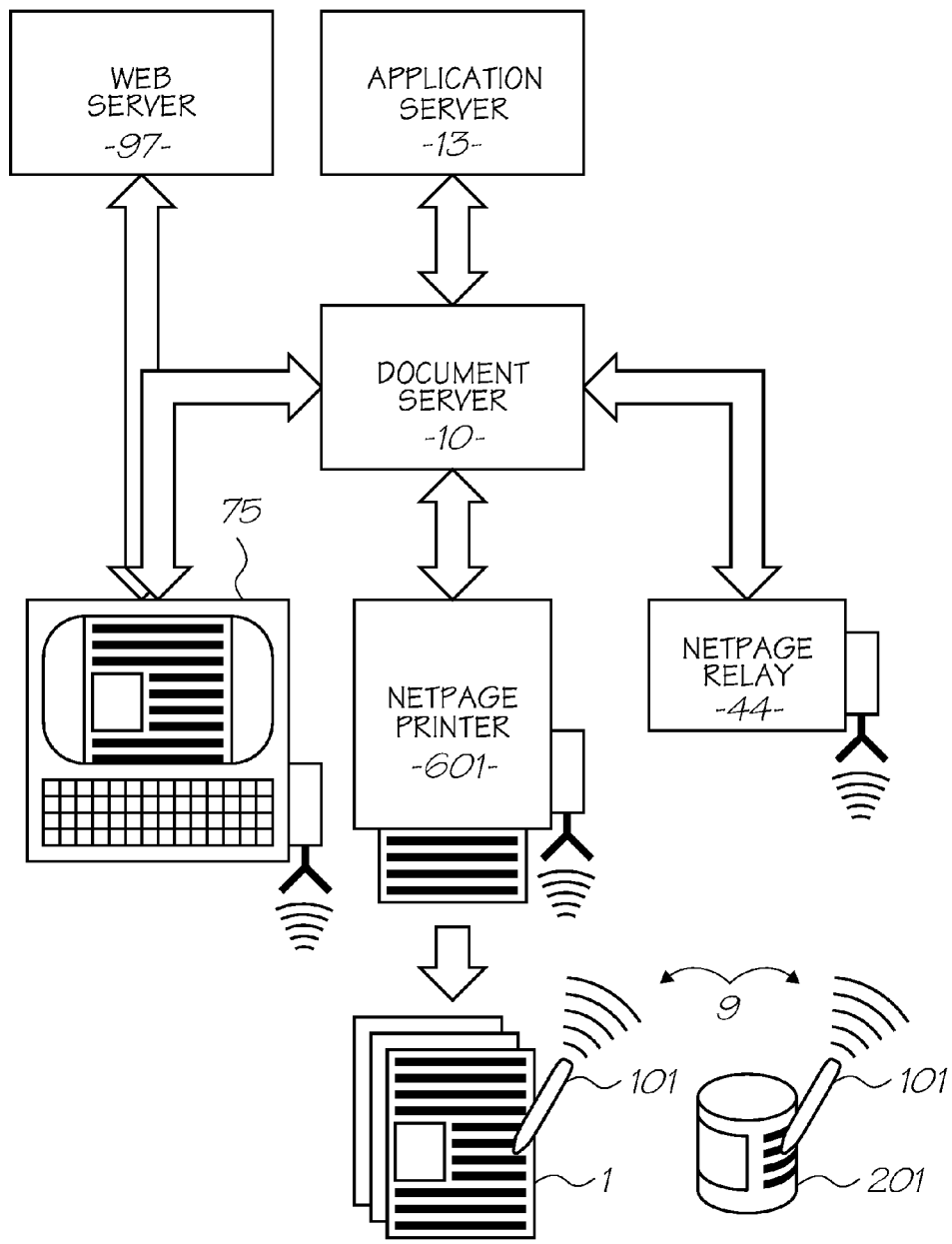
FIG. 2 is an example of a system for interacting with the Hyperlabel document of FIG. 1.
Figure 3:
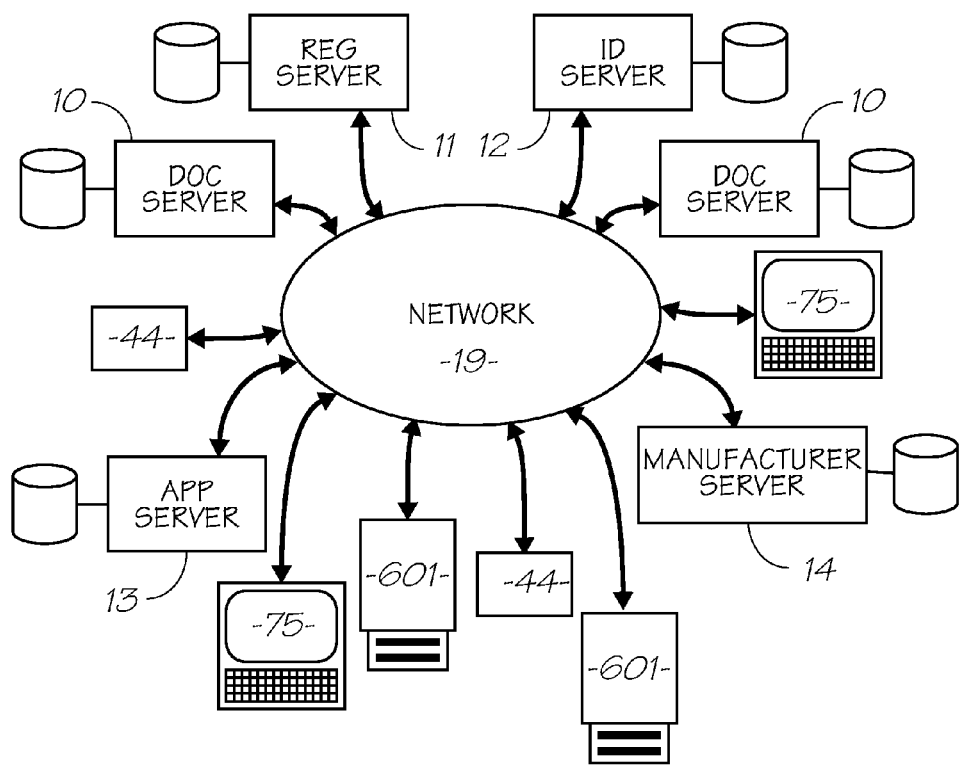
FIG. 3 is a further example of system for interacting with the Hyperlabel document of FIG. 1.

An example of a handheld validity scanner is shown in FIGS. 2 and 25.

Handheld Validity Scanner

Handheld Hyperlabel validity scanners may also be used where currency counters are not required or suitable. These devices are expected to be significantly more common than currency counters, as they have multiple uses, and will be much cheaper.

The validity scanner has multiple uses, including pharmaceutical security, brand-name security, stocktaking, forensic investigations, and policing. As it is not a dedicated currency device. It does not communicate directly with the government currency server as otherwise, large numbers of non-currency related messages would need to be routed through that server. Instead, it communicates directly with commercial Hyperlabel servers, and any currency related validation requests are passed on to the government server. To reduce the transaction load on the government server, note related information can be cached at the Hyperlabel server, much as they are cached in the currency counters.

The link to the database would typically be relayed over a radio link to allow local mobility. The radio link can be WiFi, GPRS, 3G mobile, Bluetooth, or other IP link, as appropriate. Internet transactions are secured using encrypted packets.

An example of a hand held scanner is shown in FIG. 40, with an alternative example being shown in FIG. 22.

Security Features

Hyperlabel currency security features include:
- Notes can be tracked whenever they are scanned—at banks, supermarket checkouts, vending machines, cash registers, and low cost home scanners.
- The unique range of currency tag numbers can be printed only by the government printing agency.
- Currency IR ink with unique spectral properties, can be made available only to government printing agencies.

Note serial number printed in tag must match printed serial number.

Tags are printed all over both sides of the note.

Tags vary across the note—a forger must match the thousands of tags printed on any note.

Additional proprietary security features not disclosed in this document.

The ability to determine both the validity and the value of currency.

Advantages of Hyperlabel

Unlike 2D optical barcodes that are often difficult to read due to label damage and a direct 'line-of-sight' requirement needed for scanning, optically readable, but invisible, infrared Hyperlabel tags, are printed all over, or on a large section of a product label. Hyperlabel tags support line-of-sight omnidirectional reading. In practice, the Hyperlabel reader is designed to scan the scanning field from at least two substantially orthogonal directions. This helps the reader to avoid occlusions which may occur if a hand is holding an item. Hyperlabel tags also incorporate Reed-Solomon error correction methods to improve reliability.

A further advantage of Hyperlabels over barcodes is that they are unobtrusive to the customer as they do not use visible label space, and tag information is not restricted to only one section of a label.

Hyperlabel tags are therefore easy to locate, easy to read, and enable accurate automatic scanning. Automatic checkouts minimize the possibility of collusion between the operator and the customer or the shipping agent(s). That is, it significantly reduces shrinkage due to the operator or shipping agent deliberately not scanning selected items. It also helps prevent substitution-based fraud.

Hyperlabels are less promiscuous than RFID tags since they require line-of-sight for reading. This means that it will be difficult for customers to have their product scanned for information without their knowledge. Hyperlabels provide customers with the means to protect their privacy in much the same way as they can now when carrying pharmaceutical goods.

Hyperlabels as Interactive Web Pages

A distinctive and unique feature of Hyperlabel technology is that Hyperlabels provide the opportunity to design packaging labels as interactive 'Web pages'—and thus make it possible for a whole new range of product-linked customer services to be introduced by the pharmaceutical industry.

In a few years from now when digital pen use becomes widespread, product graphics can be added to labels to indicate interactive areas and prompting customers to write or click using a Hyperlabel Pen. A digital Hyperlabel Pen can identify the x-y position on a label, and enable a link to be established between the information on the label, and a Web page on a server. The Hyperlabel Pen connects the customer to an Internet-based Hyperlabel Server through a companion device such as a mobile phone or computer.

Using a Hyperlabel Pen to interact with the label, customers can be offered additional information on drug use, risks and advice on potential interactions between drugs. It could also provide an opportunity for customers to register for participation in new drug trials, to enter promotions, to participate in Web chat sessions, or to receive 'free' samples. Web pages can be customised based on customer profiles, local area health data, or by using a range of product supply chain data such as geographic location.

Hyperlabels therefore make it possible for the pharmaceutical industry to extend the use of product labels and packaging to increase brand strength, and to establish closer links with customers. Thus, with Hyperlabels, the customer can become an integral part of the product supply chain, and supply chain data can be integrated with customer relationship management (CRM) or healthcare databases to improve the overall efficiency and level of service offered to customers.

The following sections highlight how Hyperlabel technology can be implemented to improve overall brand strength and increase security.

Brand Protection

One of the most important challenges now confronting the pharmaceutical industry is brand protection. A strong brand protection strategy is crucial for the pharmaceutical industry to protect profits and R&D investment, as well as customers. The illegal activities now used by criminals to erode brand value, and that are of most concern are:

Parallel trade and illegal imports,

Product substitution and counterfeiting, and

Product tampering.

Parallel Trade and Illegal Imports

Parallel importation of pharmaceuticals exists where there is a significant price difference for the same product in different markets.

Pharmaceutical manufacturers are firmly against parallel importation as parallel traders reduce their profits, and manufacturers claim that they will have less money to spend on R&D. Manufacturers also often express concern that parallel imports do not meet international standards on safety, quality and efficacy, and that they give rise to additional opportunities for counterfeiting. The distribution by unregulated drug outlets of expired, contaminated, subpotent, superpotent and counterfeit drugs is also a significant potential danger to customers. Unregulated dispensers may provide patients with incorrect or contraindicated medications, incorrect strengths, or medications without adequate directions for use. State agencies governing the local pharmaceutical industry may not have implemented the appropriate standards and safeguards to protect the public against such occurrences.

Another concern is that the current outlook for international parallel trade is one of controversy among governments. For example, prices for the drug Amoxil (amoxicillin) vary considerably around the world—the cheapest US$8 in Pakistan, and the most expensive US$60 in Germany. It is therefore now common for drugs like Amoxil to be illegally imported across international borders to avoid high prices. The U.S. Food and Drug Administration (FDA) estimates that approximately two million parcels containing FDA-regulated products for personal use enter the United States annually through international mail facilities. Other sources estimate that nearly 70 pharmacies in Canada (40 in Manitoba) shipped almost US$500 million dollars worth of prescriptions into the United States in 2002. In the United States this year, the pharmaceutical industry's trade group—Pharmaceutical Research and Manufacturers of America (PhRMA)—has spent US$8.5 million lobbying against a bill to allow the import of Canadian drugs. Much is therefore expected from the World Trade Organization (WTO). The outcome is likely to be further lobbying by the pharmaceutical industry to the WTO for regulations mandating the introduction of individual item identification and verification capabilities to overcome differences between national governments.

Hyperlabels can be used to reduce the possibility of parallel trade and illegal imports by using EPC linked data to determine the origin and supply chain details for each item.

Product Substitution and Counterfeiting

Counterfeit products may include products with the wrong ingredients, without active ingredients, with insufficient active ingredients, or with fake packaging. This type of illegal behavior can lead to compromises in patient safety, and economic loss for established drug manufacturers.

Although counterfeiting laws and regulations have been in place for the past 20 years, evidence of counterfeiting is increasing. The FDA estimates that up to 40% of pharmaceuticals shipped from countries such as Argentina, Colombia, and Mexico may be counterfeit. There is no unified world authority to promulgate investigations, nor a world tribunal for enforcement. Consequently, pharmaceutical firms themselves must augment legal approaches with alternative ones to protect industry, stakeholders, and customers.

Hyperlabels can assist manufacturers by making it easy to recognize non-authentic product and product tampering. A specific 'fingerprint' is created for each vial, drum, shipping container, and label. Unique identifiers for every product item coming out of the plant shipping dock can be used to collect data such as the site of manufacture, the date of packaging, storage location and time, distribution path, repackaging details, testing and possibly other information. Products might also include multiple layers of tamper evidence. Therefore, a Hyperlabel item identification system can be used to assist the pharmaceutical industry to implement an effective item level tracking and tracing system.

Product Tampering

Today, the pharmaceutical industry is in danger from the threat of pharmaceutical product tampering. Some of today's biopharmaceutical products cost in excess of $2000-$3000 per gram to produce, and some criminals (and even pharmacists) are tampering for profit. Since pharmaceuticals are critical to the social, economic and political stability of many nations, they are also vulnerable targets for terrorism. In each case, the lack of ability to determine the actual country of origin is of utmost concern.

To address these fears, a range of protection methods are now being implemented. These may include seals that need to be removed, features that must be broken, or permanent measures such as color, taste, and fragrance that are part of the product itself. Other tools include codes whose color spectrum is only visible under UV light or special-coded label words/symbols visible only with special viewing devices.

The pharmaceutical industry is also acting to secure the supply chain using new technology to protect all stakeholders, patients and manufacturers alike. This also means that Brand protection needs to be applied at several levels of packaging or containment because every level offers a possible introduction point for tampered product, and it could involve the use of several different methods. The levels for tamper evidence start with the largest unit (the warehouse building) and need to be applied at each package configuration level, down to the item label and contents. Hyperlabels, when used in parallel with other product brand protection methods, can offer the potential to improve brand protection at each of these points in the supply chain.

Adding the Customer to the Pharmaceutical Supply Chain

One of the key advantages that Hyperlabel can offer the pharmaceutical industry, is the ability to extend the use of labeling to make them Web-interactive so that customers can become an integral part of the supply chain.

There are many ways for Web-interactive Hyperlabels to bring benefits to the pharmaceutical industry. Some of these are to:
  Enable customers to authenticate a product themselves,
  Protect brand strength through improved market segmentation and customization,
  Become more customer-centric by introducing new customer-led marketing models,
  Refine the marketing mix by introducing Web-based direct to customer (DTC) marketing campaigns, and,
  Differentiate products by using extended label marketing models.

Customer Authentication of Products

While the changing of anti-counterfeit approaches helps manufacturers and regulatory agencies differentiate genuine product from false product, the rapid changes can be confusing to the public. This creates a situation where customers find it difficult to check the authenticity of a product themselves. Using a Hyperlabel Pen, customers can validate an item for themselves, as well as access additional product information and customer-centric services.

Market Segmentation and Customization

Pharmaceutical markets can be divided into three broad product segments:
  Prescription-only medicines (comprise about 80% of the market by value, and 50% by volume),
  Generic branded medicines, and
  Over the counter medicines (OTCs), which may be purchased without prescription and may also be branded or generic.

Each of these market segments requires different strategic approaches. Suppliers of branded prescription drugs need to protect R&D efforts. Generic companies focus on supply chain logistics and manufacturing costs. OTCs are rarely prescribed, and they require direct-to-customer (DTC) marketing methods. In each case, Hyperlabel Web-interactive labeling makes it possible for the pharmaceutical industry to establish a direct marketing relationship with customers in each segment, and at the same time it provides an opportunity to improve market segmentation.

Customer-Led Marketing

Most pharmaceutical companies have been product-led rather than customer-led. This has probably been a consequence of the unpredictability of the R&D process because it has not been easy to develop a product to meet specific customer needs. Web-interactive hyperlinks provide customers with an 'opt in' method of participating in new customer-led marketing activities. For example, they may make suggestions about what Web character stickers they want to appear on the packaging to make a child 'feel better'.

Web Direct to Customer (DTC) Marketing

Another emerging trend has evolved around the growing importance of direct-to-customer (DTC) advertising. As a medium, DTC TV advertising was one of factors responsible for increasing sales in the US pharmaceutical market during the 1990s. Although the EU does not yet allow DTC advertising of pharmaceuticals, customers can access product information on the Web. In the year 2000, health was one of the top 2 reasons for people to conduct Web searches. With many customers now using the Internet as a productive source of health-related information, more pharmaceutical suppliers are using the Web as a DTC advertising medium.

Extended Label Marketing Models

With 70% of purchasing choices made at the point of sale, marketers can build brand recognition and drive sales with packaging that makes an immediate impact on customers. Because of this, pharmaceutical companies now spend more on packaging than they do on advertising. As markets have matured and competitive differentiation has narrowed, packaging has become a very important component of marketing strategy.

A product's package is often its most distinctive marketing effort, and it performs a number of essential functions: The package provides a means of communicating with the customer. However, as regulations require more information to be placed on labels, while there is also a trend for packaging to 'shrink', the use of the space available becomes more important. Barcodes take up some of this space. By using invisible Web-interactive Hyperlabels, the pharmaceutical industry can conceive a range of extended label marketing models. For example, they can include hyperlinks to a Web page to request SMS reminders to take medicines, enter competitions, reorder goods, or to access support services.

Thus, there are many ways for Web-interactive Hyperlabels to bring benefits to the manufacturer, and to improve market acceptance of a pharmaceutical product.

Hyperlabel Benefits Analysis Matrix

From the conclusions drawn in the preceding sections it is evident that Hyperlabels present a unique opportunity for the pharmaceutical industry to introduce a long term, low cost, unique item identification solution that has significant advantages over alternative technologies.

A summary of the comparative advantages of Hyperlabels over 2D optical barcodes, and RFID tags is provided in Table 12. The range of benefits these advantages can deliver to the pharmaceutical industry include:

Meet current and anticipated statutory requirements,
Protect expensive R&D investment,
Limit business and customer risk through criminal and terrorist activity,
Reduce parallel trade and illegal imports,
Reduce substitution and counterfeiting,
Prevent product tampering,
Establish Web links between the industry and customers (via Hyperlabels), and
Improve pharmaceutical supply chain logistics and efficiency.

It is also clear that unique product identification, and track and trace capabilities are the foundation stones for achieving the above goals.

We claim:

1. A method for authenticating a pharmaceutical product item, the pharmaceutical product item being associated with packaging having disposed thereon or therein coded data including a number of coded data portions, each coded data portion being indicative of an identity of the pharmaceutical product item and a part of a signature, the signature being a digital signature of at least part of the identity, the signature comprising a plurality of signature parts, the method comprising the steps of:
  receiving indicating data from a sensing device, the sensing device being responsive to sensing one coded data portion to generate indicating data at least partially indicative of:
    the identity of the pharmaceutical product item;
    the part of the signature; and
    a signature part identifier;
  determining, from the received identity and the received signature part identifier, a determined signature part;
  authenticating the pharmaceutical product item by comparing the received part of the signature and the determined signature part,
wherein the signature is a digital signature of at least part of the identity and padding, and the step of determining the determined signature part comprises sub-steps of:
  determining, using the received identity of the pharmaceutical product item, the padding;
  determining, using the padding, the received identity, and a secret key, the determined signature; and
  determining the determined signature part from the determined signature and the signature part identifier.

2. A method according to claim 1, wherein the secret key is determined using the received identity.

3. A method according to claim 1, wherein the method further includes the steps of:

TABLE 12

| | REQUIREMENTS | 2D BARCODES | RFID/ EPC | HYPER LABEL |
|---|---|---|---|---|
| REGULATORY | Meets current FDA standards for food, drug and cosmetic labeling. | ✓ | ✓ | ✓ |
| | Meets WHO/FDA track and trace guidelines for deterring and detecting counterfeit drugs. | ✓ | ✓ | ✓ |
| PACKAGING MANUFACTURER | Provides a new revenue stream for existing packaging substrates. | X | X | ✓ |
| CUSTOMER | Provides customer-centered 'optin' Web interactivity for specific product items and special offers. | X | X | ✓ |
| | Provides a solution that is acceptable to privacy advocates concerned about the ability to read tags without the customer knowledge. | ✓ | X | ✓ |
| PHARMACEUTICAL INDUSTRY | Low cost to produce. | ✓ | X | ✓ |
| | Omnidirectional reading. | X | ✓ | ✓ |
| | Unobtrusive to customer. | X | ✓ | ✓ |
| | Individual product item identification. | ✓ | ✓ | ✓ |
| | Introduce new customer-centric marketing models based on Web-label interactivity. | X | X | ✓ |
| | Can be used with radiopaque materials. | ✓ | X | ✓ | determining, using the identity, tracking data at least partially indicative of the location of the pharmaceutical product item; and, determining, using the tracking data, if the pharmaceutical product item is a possible duplicate.

4. A method according to claim 1, wherein the method further includes, in response to a successful authentication, the steps of:

authorising a transaction relating to the pharmaceutical product item; and updating tracking data relating to the pharmaceutical product item, the tracking data being at least partially indicative of the location of the pharmaceutical product item.

5. A method according to claim 1, wherein the method further includes causing the display of at least one of:

results of authentication;

tracking information; and, product information.

6. A method according to claim 1, wherein the coded data is provided substantially coincident with visible human-readable information.

7. A method according to claim 1, wherein at least some of the coded data portions encode at least one of:

a location of the respective coded data portion; and a position of the respective coded data portion on the surface.

8. A method according to claim 1, wherein the coded data includes at least one of:

redundant data;

data allowing error correction;

Reed-Solomon data; and,

Cyclic Redundancy Check (CRC) data.

9. A method according to claim 1, wherein the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

10. A method according to claim 1, wherein the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

* * * * *